(12) United States Patent
Zhang

(10) Patent No.: US 12,363,281 B2
(45) Date of Patent: Jul. 15, 2025

(54) INTER PREDICTION METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 399 days.

(21) Appl. No.: 18/079,216

(22) Filed: Dec. 12, 2022

(65) Prior Publication Data

US 2023/0107111 A1    Apr. 6, 2023

Related U.S. Application Data

(63) Continuation of application No. PCT/CN2021/139051, filed on Dec. 17, 2021.

(30) Foreign Application Priority Data

Dec. 31, 2020    (CN) .......................... 202011629460.2

(51) Int. Cl.
*H04N 19/00*      (2014.01)
*H04N 19/105*    (2014.01)
(Continued)

(52) U.S. Cl.
CPC ......... *H04N 19/105* (2014.11); *H04N 19/137* (2014.11); *H04N 19/159* (2014.11); *H04N 19/176* (2014.11)

(58) Field of Classification Search
CPC ..................................................... H04N 19/00
See application file for complete search history.

(56) References Cited

U.S. PATENT DOCUMENTS

2008/0130755 A1    6/2008  Loukas et al.
2015/0003533 A1    1/2015  Suzuki
(Continued)

FOREIGN PATENT DOCUMENTS

CN    109905702 A    6/2019
CN    110662074 A    1/2020
(Continued)

OTHER PUBLICATIONS

The World Intellectual Property Organization (WIPO) International Search Report for PCT/CN2021/139051 Feb. 28, 202 6 Pages (including translation).

(Continued)

*Primary Examiner* — Maryam A Nasri
(74) *Attorney, Agent, or Firm* — ANOVA LAW GROUP, PLLC

(57) ABSTRACT

An inter prediction method includes: determining, when a current prediction mode of a current prediction block is a preset prediction mode, a historical prediction mode corresponding to the current prediction block; acquiring adjacent block information about an adjacent block of the current prediction block, prediction sub-block information about a prediction sub-block, and a historical optimal reference frame type of the current prediction block in the historical prediction mode; generating a reference frame mask based on the historical optimal reference frame type, the adjacent block information, the prediction sub-block information, and a frame type corresponding to the current prediction block; and determining a reference frame of the preset prediction mode using the reference frame mask, and performing inter prediction on the current prediction block (Continued)

using the reference frame to obtain a prediction value corresponding to the current prediction block.

20 Claims, 11 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

2015/0071353 A1* 3/2015 Nilsson .................. H04N 19/89
375/240.12
2017/0142439 A1 5/2017 Kobayashi
2020/0314446 A1* 10/2020 Tamse .................. H04N 19/176

FOREIGN PATENT DOCUMENTS

| CN | 111818342 A | 10/2020 |
| CN | 112312131 A | 2/2021 |
| JP | 2003284091 A | 10/2003 |
| JP | 2010509850 A | 3/2010 |
| JP | 2017098601 A | 6/2017 |
| KR | 102075208 B1 | 2/2020 |

OTHER PUBLICATIONS

The Japan Patent Office (JPO) Notification of Reasons for Refusal for Application No. 2023-518518 and Translation May 7, 2024 10 Pages.
The European Patent Office (EPO) The Extended European Search Report for 21913956.5 Mar. 22, 2024 25 Pages.
Jieon Kim et al. "Fast inter-prediction based on decision trees for AV1 encoding." ICASSP 2019-2019 IEEE International Conference on Acoustics, Speech and Signal Processing (ICASSP). IEEE, 2019.
Zhaoqing Pan et al. "Fast reference frame selection based on content similarity for low complexity HEVC encoder." Journal of Visual Communication and Image Representation 40 (2016): 516-524.

* cited by examiner

INTER PREDICTION METHOD AND APPARATUS, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2021/139051, entitled "INTER-FRAME PREDICTION METHOD AND APPARATUS, ELECTRONIC DEVICE, COMPUTER-READABLE STORAGE MEDIUM, AND COMPUTER PROGRAM PRODUCT" and filed on Dec. 17, 2021, which claims priority to Chinese Patent Application No. 202011629460.2 and filed on Dec. 31, 2020, and claims priority to the Chinese Patent Application, the entire contents of both of which are incorporated herein by reference.

FIELD OF THE TECHNOLOGY

The present disclosure relates to a video coding technology, and in particular, to an inter prediction method and apparatus, an electronic device, a computer-readable storage medium, and a computer program product.

BACKGROUND OF THE DISCLOSURE

Video coding is widely used in video transmission, and video tends to be at a high definition, a high frame rate and a high compression rate in the future. When a video frame is coded by an inter prediction, it is necessary to divide the video frame into individual coding units (CU). When the CU calculates a prediction value by the inter prediction, it is necessary to select an appropriate reference frame for the CU in a prediction mode before starting prediction, so as to obtain a prediction value.

When selecting an appropriate reference frame, some reference frame modes which are considered to be unimportant are compulsorily eliminated, the prediction mode and the remaining reference frame modes are then combined, and an appropriate reference frame mode may be obtained after a high-complexity preference process for each mode combination. However, the calculation complexity of the preference process is high, resulting in low video coding efficiency.

SUMMARY

Embodiments of the present disclosure provide an inter prediction method and apparatus, an electronic device, a computer-readable storage medium, and a computer program product, capable of improving the efficiency of video coding.

The technical solutions in the embodiments of the present disclosure are implemented as follows:

Embodiments of the present disclosure provide an inter prediction method, including: determining, when a current prediction mode of a current prediction block is a preset prediction mode, a historical prediction mode corresponding to the current prediction block, the historical prediction mode being a prediction mode in which prediction is completed before the preset prediction mode; acquiring adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type; generating a reference frame mask based on the historical optimal reference frame type, the adjacent block information, the prediction sub-block information, and a frame type corresponding to the current prediction block; and determining a reference frame of the preset prediction mode using the reference frame mask, and performing inter prediction on the current prediction block using the reference frame to obtain a prediction value corresponding to the current prediction block.

Embodiments of the present disclosure provide an inter prediction apparatus, including: a mode determination module, configured to determine, when a current prediction mode of a current prediction block is a preset prediction mode, a historical prediction mode corresponding to the current prediction block, the historical prediction mode being a prediction mode in which prediction is completed before the preset prediction mode; an information acquisition module, configured to acquire adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type; a mask generation module, configured to generate a reference frame mask based on the historical optimal reference frame type, the adjacent block information, the prediction sub-block information, and a frame type corresponding to the current prediction block; and an information prediction module, configured to determine a reference frame of the preset prediction mode using the reference frame mask, and perform inter prediction on the current prediction block using the reference frame to obtain a prediction value corresponding to the current prediction block.

Embodiments of the present disclosure provide an electronic device for inter prediction, including: a memory, configured to store executable instructions; and a processor, configured to implement the inter prediction method provided in the embodiments of the present disclosure when executing the executable instructions stored in the memory.

An embodiment of the present disclosure provides a non-transitory computer-readable storage medium, storing executable instructions, the executable instructions, when executed by a processor, implementing the inter prediction method provided in the embodiments of the present disclosure.

The embodiments of the present disclosure have the following beneficial effects: When a current prediction mode is a preset prediction mode, a historical prediction mode corresponding to the current preset prediction mode is determined, and a historical optimal reference frame type of the current prediction block in the historical prediction mode, information about an adjacent block of the current prediction block in the historical prediction mode, and prediction sub-block information corresponding to a prediction sub-block obtained by partitioning the current prediction block in the historical prediction mode are then acquired, whereby the current prediction block directly inherits various information corresponding to the historical prediction mode which has been performed before the preset prediction mode. Then, in the preset prediction mode, a reference frame mask is generated adaptively for the current prediction block. In this way, considering the characteristics of the preset prediction mode in video coding, the reference frame mask is generated directly using some existing information, thus greatly reducing the calculation complexity and improving the efficiency of video coding.

DESCRIPTION OF EMBODIMENTS

Figure 1:
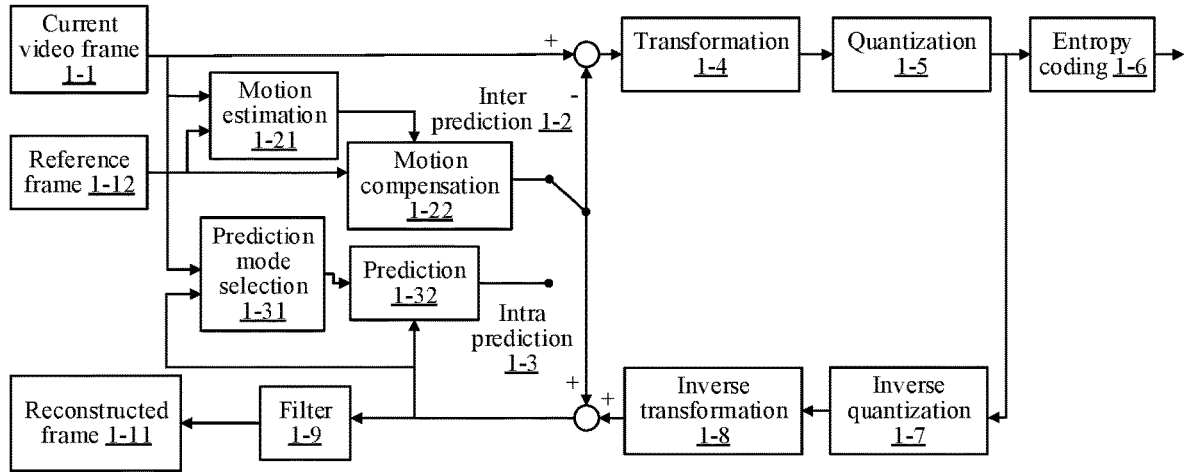
FIG. 1 is an example diagram of a coding framework of AV1.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following description, the involved term "first/second" is merely intended to distinguish similar objects but does not necessarily indicate a specific order of an object. It may be understood that "first/second" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as that usually understood by a person skilled in the technical field to which the present disclosure belongs. Terms used in this specification are merely intended to describe objectives of the embodiments of the present disclosure, but are not intended to limit the present disclosure.

Before the embodiments of the present disclosure are further described in detail, nouns and terms involved in the embodiments of the present disclosure are described. The nouns and terms provided in the embodiments of the present disclosure are applicable to the following explanations.

1) Intra coding is a coding mode for reducing the spatial redundancy between adjacent pixels using a correlation existing between adjacent pixels within a video frame of a video image.

2) Inter coding is a coding mode for eliminating the temporal redundancy between adjacent frames using similarity between adjacent frames in a video image, thus improving the video coding efficiency.

3) A motion vector (MV) is a vector for marking a positional relationship between a current block and a reference block in inter prediction. In inter coding, image contents in adjacent frames have a certain correlation, a frame image is divided into a plurality of blocks, the position of each block in an adjacent video frame is searched, and a relative offset of a spatial position therebetween is calculated. The obtained relative offset is a motion vector.

4) A motion estimation (ME) refers to the process of estimating motion vectors.

5) A motion vector prediction (MVP) refers to an initial position of an MV derived from an adjacent block of a current block.

6) A motion vector difference (MVD) refers to a difference value between the MV and the MVP, i.e. MVD=MV−MVP. In use, a difference value (MVD) between an MV prediction value and an actual value may also be coded to reduce the consumption of the number of bits.

7) A rate distortion cost (RDCost) is used for preferentially selecting a plurality of coding modes. The calculation formula for RDCost is shown in Formula (1):

$$RDCost=dist+bit+\lambda \quad (1)$$

where dist is distortion, i.e. a residual signal between original and prediction pixels of a pixel block, bit is a minimum unit of information, and is a Lagrange multiplier.

8) A sum of absolute difference (SAD) reflects a time domain difference of the residual signal and cannot effectively reflect the size of a bitstream.

9) A sum of absolute transformed difference (SATD) is a mode of calculating distortion, which is obtained by performing Hadamard transform on the residual signal and then summing absolute values of various elements. The SATD has a higher calculation amount but a higher calculation accuracy than the SAD.

10) A sum of the squared errors (SSE) is another mode of calculating distortion, and is the sum of the squared errors of original pixels and reconstructed pixels. A process of transforming, quantizing, inversely quantizing, and inversely transforming the residual signal is required to calculate the SSE. Although the calculation complexity is large, an estimated codeword is the same as a real code, and a selected coding mode saves the codeword most.

Video coding is widely used in video transmission, and video tends to be at a high definition, a high frame rate and a high compression rate in the future. This requires the compression efficiency of video coding to be continuously upgraded. The first generation video coding standard (AV1) has received tremendous attention since its introduction.

Compared with other video coding technologies, such as high efficiency video coding (HEVC) and advance video coding (AVC), AV1 has a higher compression rate, the occupied bandwidth may be reduced by 30% when the transmission quality is the same, and AV1 may be used for coding transmission, whether for streaming media or pictures, and may be widely used in screen sharing and video game streams.

FIG. 1 is an example diagram of a coding framework of AV1. As shown in FIG. 1, an electronic device firstly segments a current video frame 1-1 that has been sent in the electronic device into a plurality of 128×128 coding tree units (CTU) and then segments each CTU into rectangular coding units (CU) according to 10 different segmentation rules. Each CU includes a plurality of prediction modes and transform units (TU). The electronic device performs an inter prediction 1-2 or an intra prediction 1-3 on each CU to obtain a prediction value. The inter prediction 1-2 includes a motion estimation (ME) 1-21 and a motion compensation (MC) 1-22, and a reference frame 1-12 needs to be used. The intra prediction 1-3 includes a prediction mode selection 1-31 and a prediction 1-32. The electronic device subtracts a prediction value from an input value of each CU to obtain a residual value, transforms 1-4 and quantizes 1-5 the residual value to obtain a residual coefficient, and then performs entropy coding 1-6 on the residual coefficient to obtain an output bitstream. Meanwhile, the electronic device also inversely quantizes 1-7 and inversely transforms 1-8 the residual coefficient so as to obtain a residual value of a reconstructed image. The electronic device sums the residual value and the prediction value of the reconstructed image so as to obtain the reconstructed image, performs the intra prediction mode selection 1-31 and performs the intra prediction 1-32 according to the reconstructed image. The electronic device also needs to filter 1-9 the reconstructed image. The filtered reconstructed image is a reconstructed frame 1-11 corresponding to the current video frame 1-1. The reconstructed frame 1-11 may enter a reference frame queue to serve as a reference frame of a next video frame so as to sequentially code backwards.

Figure 2:
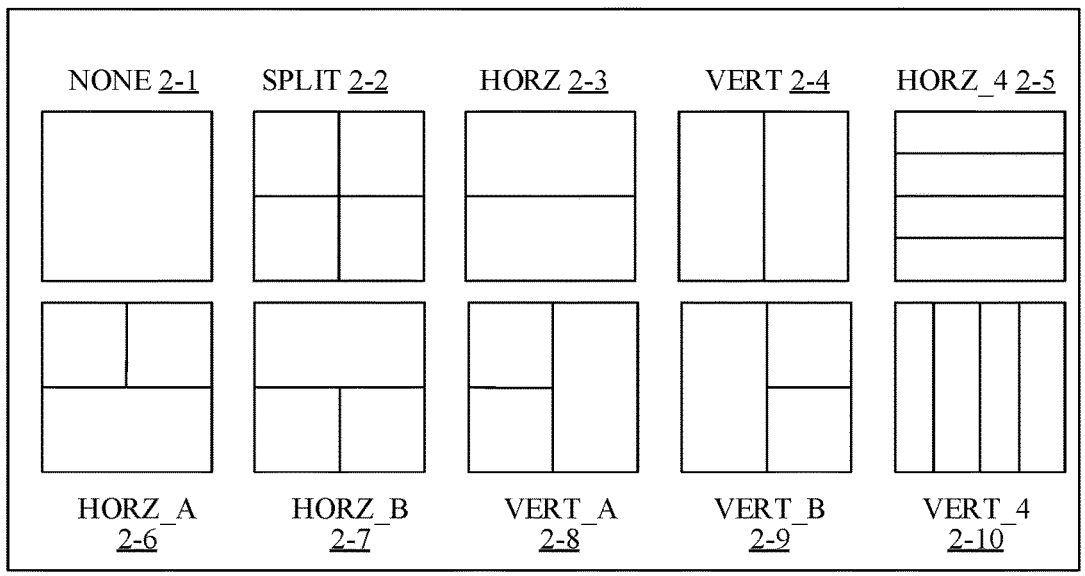
FIG. 2 is an example diagram of a segmentation rule for a CU.

Further, there is more than one segmentation rule for a CU. FIG. 2 is an example diagram of a segmentation rule for a CU. As shown in FIG. 2, there are 10 segmentation rules for a CU, which are non-segmentation (NONE) 2-1, quartering (SPLIT) 2-2, horizontal bisection (HORZ) 2-3, vertical bisection (VERT) 2-4, horizontal quartering (HORZ_4) 2-5, first horizontal trisection (HORZ_A) 2-6, second horizontal trisection (HORZ_B) 2-7, first vertical trisection (VERT_A) 2-8, second vertical trisection (VERT_B) 2-9, and vertical quartering (VERT_4) 2-10, respectively. These 10 segmentation rules correspond to 22 block sizes, which are 4×4, 4×8, 8×4, 8×8, 8×16, 16×8, 16×16, 16×32, 32×16, 32×32, 32×64, 64×32, 64×64, 64×128, 128×64, 128×128, 4×16, 16×4, 8×32, 32×8, 16×64, and 64×16, respectively.

In prediction, each CU includes a plurality of prediction modes, i.e. each CU includes an intra prediction mode and an inter prediction mode. The electronic device firstly compares different prediction modes within the same prediction type to obtain an optimal prediction mode, and then compares the intra prediction mode with the inter prediction mode to find an optimal prediction mode of each CU. Meanwhile, since each CU includes a plurality of TUs, the electronic device needs to select an optimal TU among the plurality of TUs included in each CU and then divide the current video frame into CUs.

The intra prediction mode includes the following: a mean prediction (DC_PRED) based on average of above and left reference pixels, a combined horizontal and vertical difference prediction (SMOOTH_PRED), a vertical interpolation prediction (SMOOTH_V_PRED), a horizontal interpolation prediction (SMOOTH_H_PRED), a gradient minimum direction prediction (PEATH_PRED), and predictions of eight different main directions. The predictions of eight different main directions are respectively: vertical direction prediction (V_PRED), horizontal direction prediction (H_PRED), 45-degree direction prediction (D45_PRED), 67-degree direction prediction (D67_PRED), 113-degree direction prediction (D113_PRED), 135-degree direction prediction (D135_PRED), 157-degree direction prediction (D157_PRED), and 203-degree direction prediction (D203_PRED). Each main direction includes six angular offsets: plus-minus three degrees, plus-minus six degrees, and plus-minus nine degrees, respectively. In some cases, the intra prediction mode may also include a palette prediction mode and an intra block copy prediction.

Figure 3:
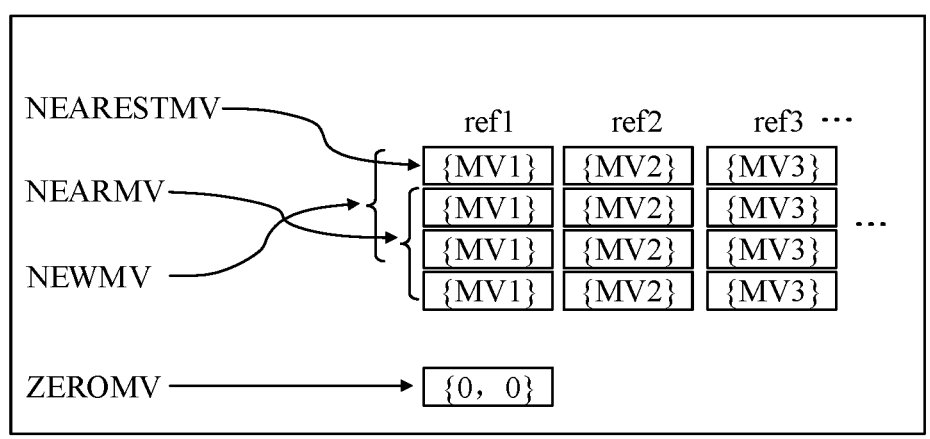
FIG. 3 is a schematic diagram of MVP selection for different single reference frame modes.

The inter prediction has four single reference frame modes and eight combined reference frame modes. The four single reference frame modes refer to prediction using single reference frames, and the four single reference frame modes may include: NEARESTMV, NEARMV, GLOBALMV, and NEWMV. The eight combined reference frame modes refer to prediction using a combined reference frame, and include: NEAREST_NEARESTMV, NEAR_NEARMV, NEAREST_NEWMV, NEW_NEARESTMV, NEAR_NEWMV, NEW_NEARMV, GLOBAL_GLOB_ALMV, and NEW_NEWMV. NEARESTMV and NEARMV refer to that an MV of a prediction block is derived according to surrounding block information, and an MVD does not need to be transmitted. NEWMV refers to that the MV is obtained according to the transmitted MVD. GLOBALMV refers to that the MV information of the prediction block is derived according to a global motion. It can be seen therefrom that NEARESTMV, NEARMV and NEWMV all rely on the derivation of MVPs. For a given reference frame, AV1 may calculate four MVPs according to a derivation rule for MVPs. The derivation rule for MVPs is as follows:

The electronic device scans block information about left columns 1, 3 and 5 and upper rows 1, 3 and 5 of a current block in a jumping manner according to a certain manner. A block using the same reference frame as the current block is firstly selected so as to perform de-duplication on MVs. If the number of MVs after de-duplication is less than 8, a reference frame in the same direction is selected, and MVs are continuously added. If the number of MVs is still less than 8, global motion vectors are used for filling until eight MVs are selected. Then, the electronic device sorts the selected eight MVs, and selects the most important four MVs according to a sorting result. Then, the electronic device selects corresponding MVPs from the four MVs for the three single reference frame modes: NEARESTMV, NEARMV and NEWMV. FIG. 3 is a schematic diagram of MVP selection for different single reference frame modes. Referring to FIG. 3, a single reference frame list includes a plurality of reference frames, which are ref1, ref2, ref3, . . . . The electronic device selects to use a block of the reference frame ref1, selects the most important four MV1 (MV2 and MV3 are MVs of ref2 and ref3 respectively) after selecting eight MVs, and then uses the 0th MV1 as an MVP corresponding to NEARESTMV, an MV1 among the 1st to 3rd MV1 as an MVP of NEARMV, and an MV1 among the 0th to 2nd MV1 as an MVP of NEWMV. Meanwhile, the electronic device may also determine ZEROMV as {0, 0}.

Each of the four single reference frame modes of the inter prediction mode corresponds to seven different reference frame types, and the seven reference frame types and the meanings thereof are as shown in Table 1:

TABLE 1

| Reference frame type | Value | Meaning |
| --- | --- | --- |
| LAST_FRAME | 1 | Picture order count (POC) is less than a reference frame closest to a current frame in the current frame |
| LAST2_FRAME | 2 | POC is less than a reference frame second-closest to a current frame in the current frame |
| LAST3_FRAME | 3 | POC is less than a reference frame third-closest to a current frame in the current frame |
| GOLDEN_FRAME | 4 | POC is less than an I frame or GPB frame corresponding to a current frame |
| BWDREF_FRAME | 5 | POC is greater than a reference frame closest to a current frame in the current frame |
| ALTREF2_FRAME | 6 | POC is greater than a reference frame second-closest to a current frame in the current frame |
| ALTREF_FRAME | 7 | POC is greater than a reference frame third-closest to a current frame in the current frame |

Each of the eight combined reference frame modes of the inter prediction mode has {LAST_FRAME, ALTREF_FRAME}, {LAST2_FRAME, ALTREF_FRAME}, {LAST3_FRAME, ALTREF_FRAME}, {GOLDEN_FRAME, ALTREF_FRAME}, {LAST_FRAME, BWDREF_FRAME}, {LAST2_FRAME, BWDREF_FRAME}, {LAST3_FRAME, BWDREF_FRAME}, {GOLDEN_FRAME, BWDREF_FRAME}, {LAST_FRAME, ALTREF2_FRAME}, {LAST2_FRAME, ALTREF2_FRAME}, {LAST3_FRAME, ALTREF2_FRAME}, {GOLDEN_FRAME, ALTREF2_FRAME}, {LAST_FRAME, LAST2_FRAME}, {LAST_FRAME, LAST3_FRAME}, {LAST_FRAME, GOLDEN_FRAME}, {BWDREF_FRAME, ALTREF_FRAME}.

It can be seen therefrom that there are 156 (i.e. 7×4+16×8) mode combinations (i.e. combinations composed of prediction modes and reference frame modes) for the inter prediction mode. Each mode combination may correspond to at most three MVPs, and then four processes including motion estimation (motion estimation will be performed only when the prediction mode includes a NEWMV mode), inter_inter preference, interpolation mode preference, and motion mode preference are performed on the current MVP, thus selecting the most appropriate mode combination.

Figure 4:
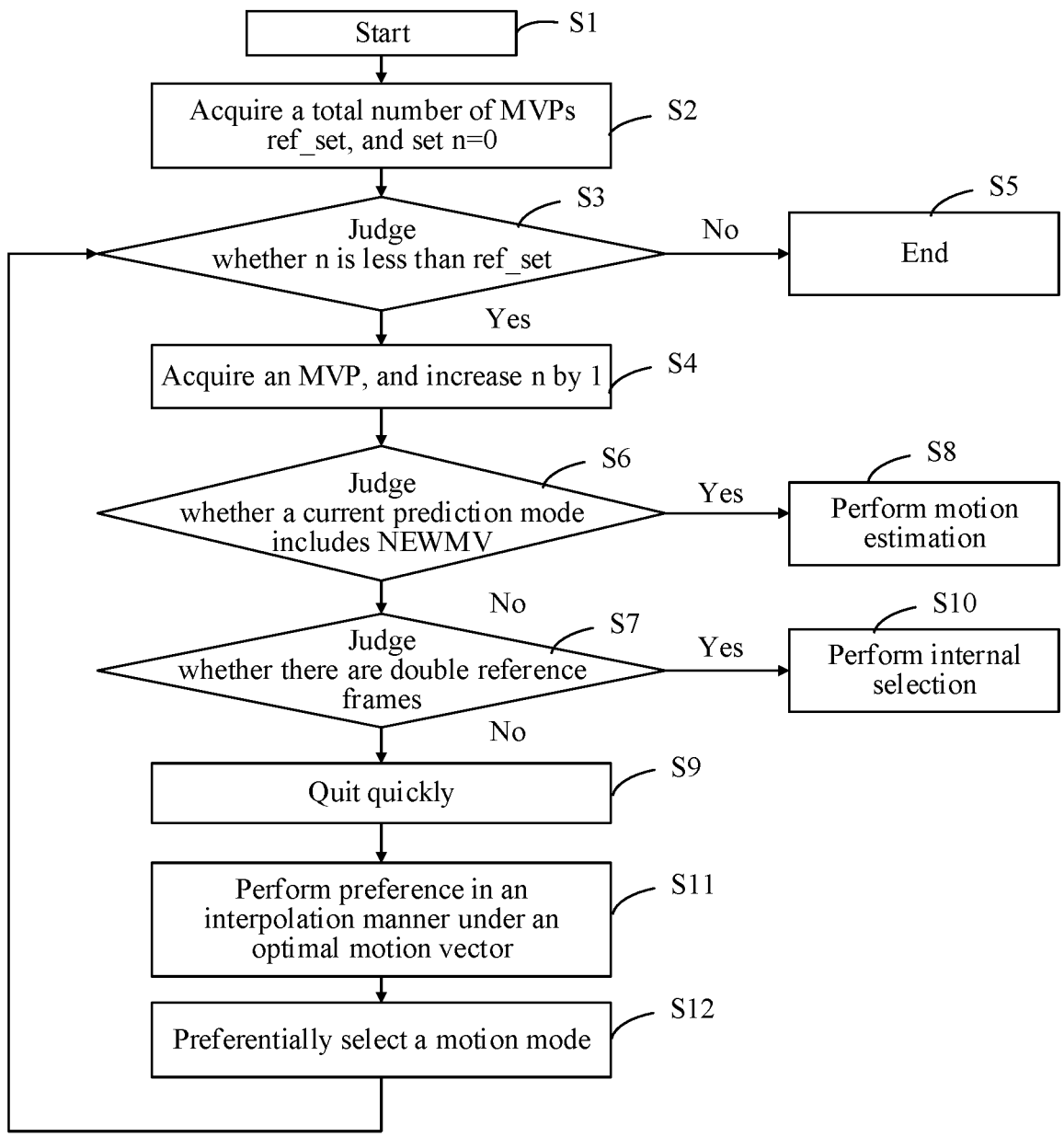
FIG. 4 is a schematic diagram of a process of preferentially selecting the most appropriate mode combination.

Exemplarily, FIG. 4 is a schematic diagram of a process of preferentially selecting the most appropriate mode combination. Referring to FIG. 4, the process of selecting the most appropriate mode combination may include:

S1. Start.

S2. Acquire a total number of MVPs ref set, and set n=0, where n is a serial number of a current MVP.

S3. Judge whether n is less than ref set, if yes, perform S4, and if no, perform S5.

S4. Acquire an MVP, and increase n by 1.

S5. End

S6. Judge whether a current prediction mode includes NEWMV, if no, perform S7, and if yes, perform S8, i.e. perform motion estimation.

This is because motion estimation has a large calculation amount and low speed, not all prediction modes require motion estimation, and only if the prediction mode includes NEWMV, motion estimation is required.

S7. Judge whether there are double reference frames, if no, perform S9, and if yes, perform S10.

S8. Perform motion estimation.

S9. Quit quickly.

After S9, S11 is performed next.

S10. Perform inter_inter preference.

S11. Perform preference in an interpolation direction under an optimal motion vector.

S12. Preferentially select a motion mode.

After the motion mode is preferentially selected, S3 is performed again for a cycle until the most appropriate reference frame mode is selected.

It can be seen from the above analysis that the calculation complexity of the process of preferentially selecting each mode combination is very large. In particular, it is also necessary to perform motion estimation on the mode combination including the NEWMV mode, so that the coding speed is relatively low, and the video coding efficiency is relatively low. If the number of mode combinations is reduced by compulsorily eliminating some reference frame modes, the consideration of the features of a prediction mode will be reduced, and the consideration of the features of a video scene will also be reduced. The adaptive degree of a prediction scene is lower, so that the adaptive ability of a reference frame mask is lower, and it is very likely that the coding loss will increase with the increase of coding time, and the quality of bitstreams obtained is not high.

Embodiments of the present disclosure provide an inter prediction method and apparatus, an electronic device, a computer-readable storage medium, and a computer program product, capable of improving the efficiency of video coding. An exemplary application of an electronic device for inter prediction according to the embodiments of the present disclosure is described below. The electronic device according to the embodiments of the present disclosure may be implemented as a terminal or a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, a smart appliance, or an in-vehicle terminal, but is not limited thereto. The terminal and the server may be directly or indirectly connected in a wired or wireless communication manner. This is not limited in the present disclosure. An exemplary application of the electronic device will be described below.

Figure 5:
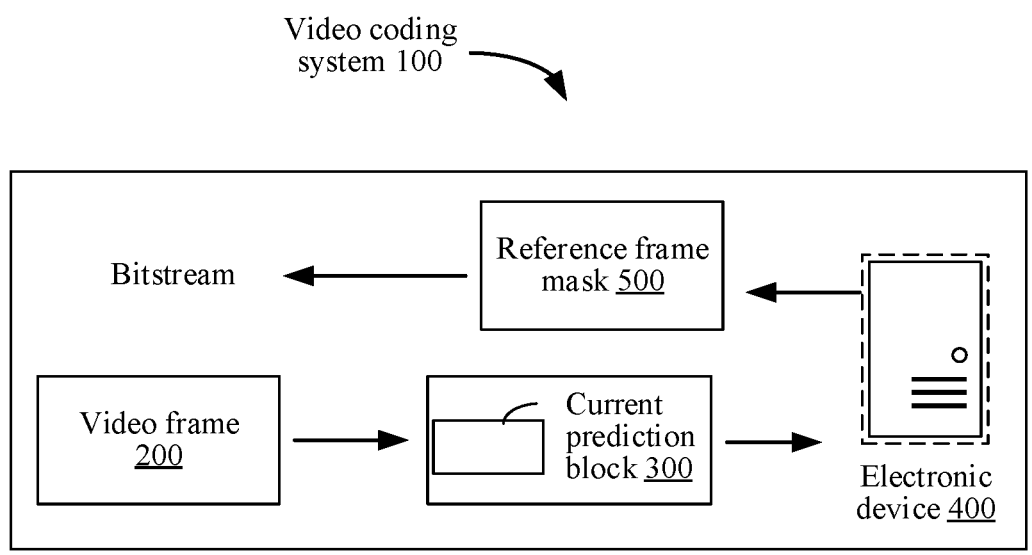
FIG. 5 is an example schematic architecture diagram of a video coding system according to an embodiment of the present disclosure.

Referring to FIG. 5, FIG. 5 is an example schematic architecture diagram of a video coding system according to an embodiment of the present disclosure. In order to support an inter prediction application, in a video coding system 100, an electronic device 400 reads in a video frame 200 waiting to be coded and then segments the video frame 200 into a plurality of image blocks, and selects one image block therefrom as a current prediction block 300. The electronic device 400 firstly determines a current prediction mode of the current prediction block 300, and determines a historical prediction mode corresponding to the current prediction block when the current prediction mode of the current prediction block is a preset prediction mode, i.e. determines a prediction mode in which prediction is completed by the current prediction block before the preset prediction mode. The electronic device 400 acquires adjacent block information about the current prediction block 300, prediction sub-block information about a prediction sub-block, and a historical optimal reference frame type of the current prediction block in the historical prediction mode. The prediction sub-block is obtained by partitioning the current prediction block using a sub-block division type preceding a current sub-block division type. The electronic device 400 generates a reference frame mask 500 based on the historical optimal reference frame type, the adjacent block information, the prediction sub-block information, and a frame type corresponding to the current prediction block. Then, the electronic device 400 determines a reference frame corresponding to the preset prediction mode using the reference frame mask 500, and performs inter prediction on the current prediction block using the reference frame to obtain a prediction value corresponding to the current prediction block. After obtaining the prediction value, the electronic device 400 calculates a residual corresponding to the prediction value, and obtains a final bitstream by transforming, quantizing and entropy-coding the residual.

Figure 6:
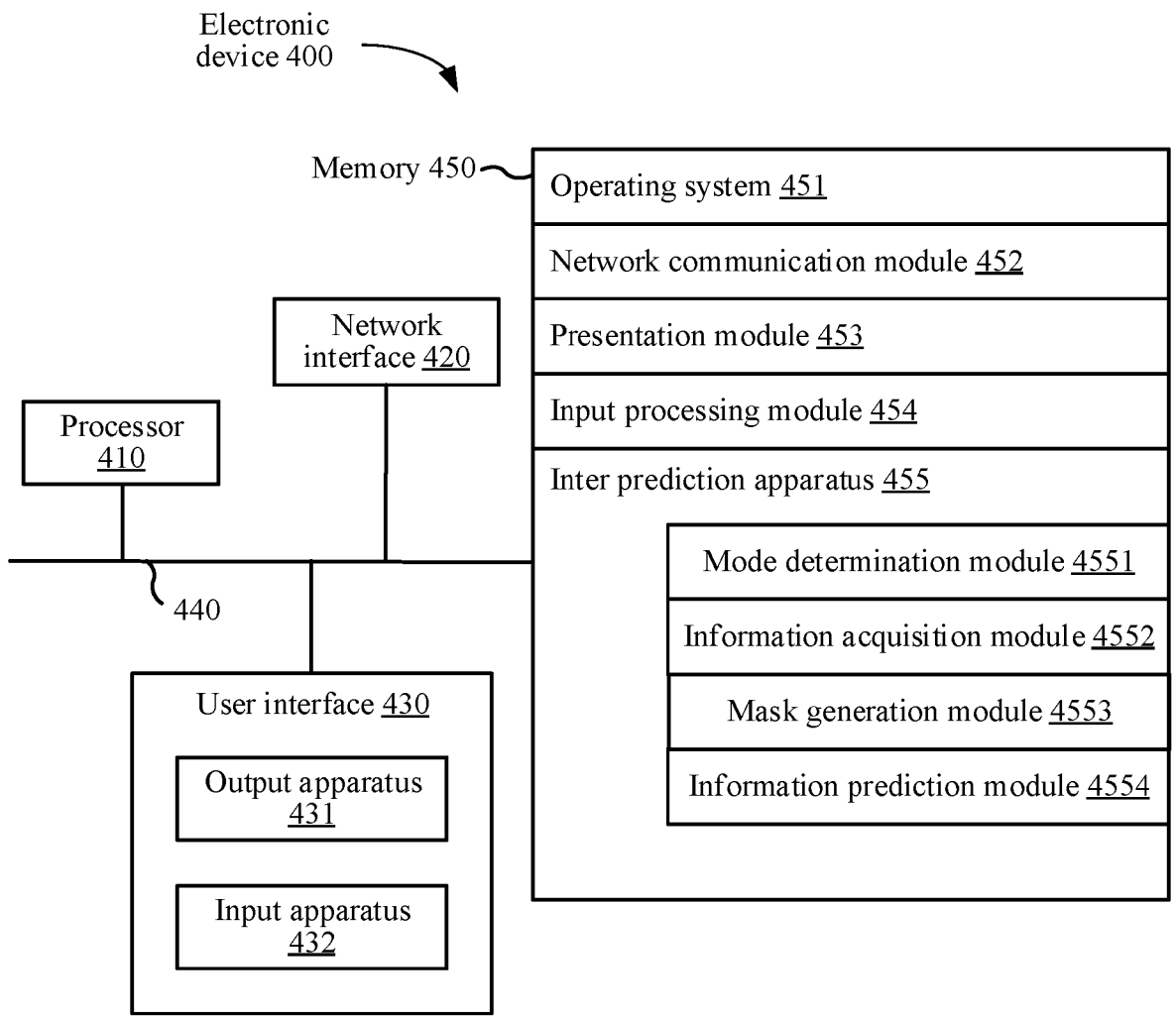
FIG. 6 is a schematic structural diagram of an electronic device for inter prediction according to an embodiment of the present disclosure.

Referring to FIG. 6, FIG. 6 is a schematic structural diagram of an electronic device for inter prediction according to an embodiment of the present disclosure. The electronic device 400 shown in FIG. 6 includes: at least one processor 410, a memory 450, at least one network interface 420, and a user interface 430. All the components in the electronic device 400 are coupled together by using a bus system 440. It may be understood that, the bus system 440 is configured to implement connection and communication between the components. In addition to a data bus, the bus system 440 further includes a power bus, a control bus, and a state signal bus. However, for ease of clear description, all types of buses in FIG. 6 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and another input button and control.

The memory 450 may be a removable memory, a non-removable memory, or a combination thereof. Exemplary hardware devices include a solid-state memory, a hard disk drive, an optical disc driver, or the like. The memory 450 example includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of the present disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A presentation module 453 is configured to present information (for example, a user interface for operating peripherals and displaying content and information) via one or more output apparatuses 431 (for example, a display screen, a speaker, etc.) associated with the user interface 430.

An input processing module 454 is configured to detect one or more user inputs or interactions from one of the one or more input apparatuses 432 and translate the detected input or interaction.

In some embodiments, the inter prediction apparatus according to the embodiments of the present disclosure may be implemented in the form of software. FIG. 6 shows an inter prediction apparatus 455 stored in the memory 450, which may be software in the form of a program and a plug-in, etc., and includes the following software modules: a mode determination module 4551, an information acquisition module 4552, a mask generation module 4553, and an information prediction module 4554. These modules are logical. Therefore, any combination or further division may be performed according to the functions realized. The following describes functions of the modules.

In some other embodiments, the inter prediction apparatus provided in this embodiment of the present disclosure may be implemented by using hardware. For example, the inter prediction apparatus provided in this embodiment of the present disclosure may be a processor in a form of a hardware decoding processor, programmed to perform the inter prediction method provided in the embodiments of the present disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Exemplarily, embodiments of the present disclosure provide an electronic device for inter prediction, including:

a memory, configured to store executable instructions; and a processor, configured to implement the inter prediction method provided in the embodiments of the present disclosure when executing the executable instructions stored in the memory.

The inter prediction method according to the embodiments of the present disclosure will be described below in combination with exemplary applications and implementations of the electronic device according to the embodiments of the present disclosure. The embodiments of the present disclosure may be implemented by means of a cloud technology. The cloud technology is a hosting technology that unifies a series of resources such as hardware, software, and networks in a wide area network or a local area network to implement computing, storage, processing, and sharing of data.

Figure 7:
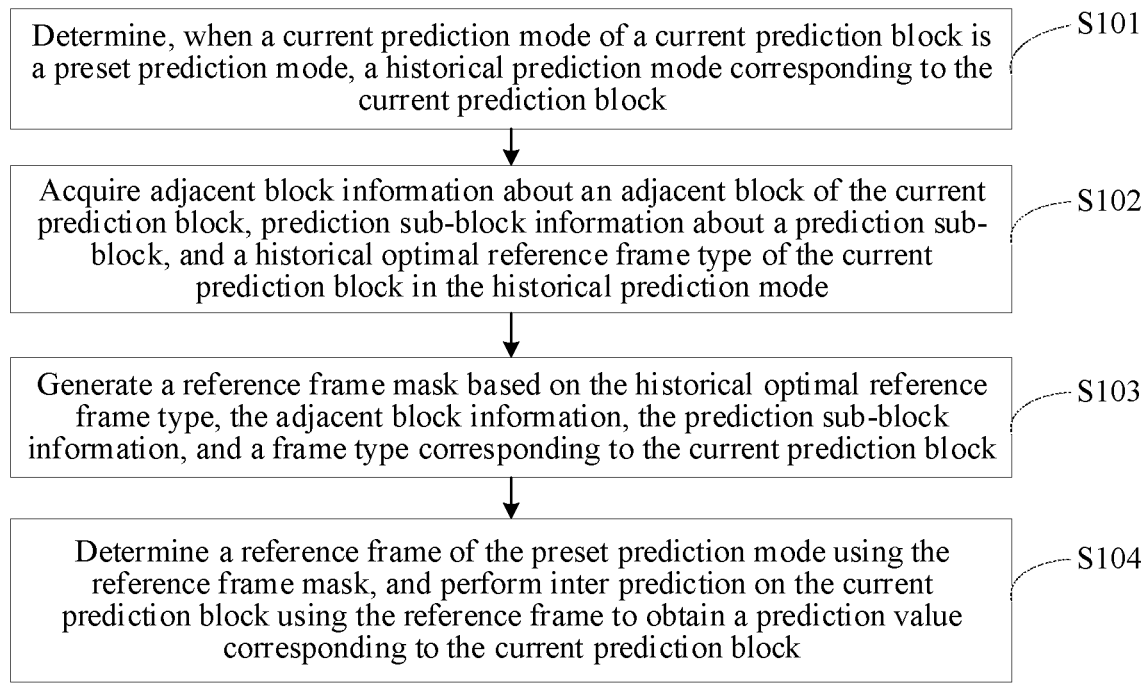
FIG. 7 is an example schematic flowchart 1 of an inter prediction method according to an embodiment of the present disclosure.

Referring to FIG. 7, FIG. 7 is an example schematic flowchart 1 of an inter prediction method according to an embodiment of the present disclosure. The description will be made in conjunction with the steps shown in FIG. 7.

S101. Determine, when a current prediction mode of a current prediction block is a preset prediction mode, a historical prediction mode corresponding to the current prediction block.

The embodiments of the present disclosure are implemented in a scene where video is coded. An electronic device firstly divides an input video frame into a plurality of image blocks. A current prediction block is an image block predicted at a current moment among the plurality of image blocks. The electronic device predicts the current prediction block each time with different reference frame modes. A current prediction mode is a reference frame mode used at the current moment for predicting the current prediction block. When determining that the current prediction mode is a preset prediction mode, the electronic device collects prediction modes that have been completed before the preset prediction mode (a corresponding reference frame mask is determined), and determines these prediction modes as historical prediction modes. That is to say, the historical prediction mode is a prediction mode in which prediction is completed before the preset prediction mode.

The preset prediction mode may be a single reference frame mode of NEWMV, and may also be a combined reference frame mode including NEWMV in the embodiments of the present disclosure. This is not limited in the embodiments of the present disclosure herein.

It is to be understood that four single reference frame modes of inter prediction have a certain order of precedence in prediction. For example, before the prediction of a NEWMV mode, NEAEESTMV, NEARMV and GLOBALMV have already completed the prediction. Thus, the historical prediction mode in the embodiments of the present disclosure may be any one of the NEAEESTMV, NEARMV and GLOBALMV modes, and may also be a combination of NEAEESTMV, NEARMV and GLOBALMV.

S102. Acquire adjacent block information about an adjacent block of the current prediction block, prediction sub-block information about a prediction sub-block, and a historical optimal reference frame type of the current prediction block in the historical prediction mode.

Since the current prediction block has been predicted using the historical prediction mode, a historical optimal reference frame type of the current prediction block in the historical prediction mode may be determined after the prediction using the historical prediction mode, and the electronic device may directly acquire the historical optimal reference frame type. Meanwhile, there are multiple different sub-block division manners for the current prediction block, and the prediction sub-block is obtained by partitioning the current prediction block using a sub-block division type preceding a current sub-block division type. Thus, the prediction sub-block is known, and information about the prediction sub-block is known. Similarly, adjacent block information corresponding to an adjacent block is also known. Therefore, in the embodiments of the present disclosure, the electronic device may directly acquire the prediction sub-block information and the adjacent block information.

The adjacent block information may include a motion vector of an adjacent block, a reference frame type corresponding to the adjacent block, i.e. an adjacent reference frame type, and may further include the number of adjacent blocks, etc. This is not limited in the present disclosure herein.

The prediction sub-block information may include a reference frame type of the prediction sub-block, i.e. a historical sub-reference frame type, and may further include the number of prediction sub-blocks, etc. This is not limited in the present disclosure herein.

It is to be understood that the adjacent blocks may refer to image blocks on the left, upper left, upper, and upper right of the current prediction block, and may also refer to image blocks in columns 1, 3 and 5 on the left of the current prediction block, and image blocks in rows 1, 3 and 5 above the current prediction block. This is not limited in the present disclosure herein.

Figure 8:
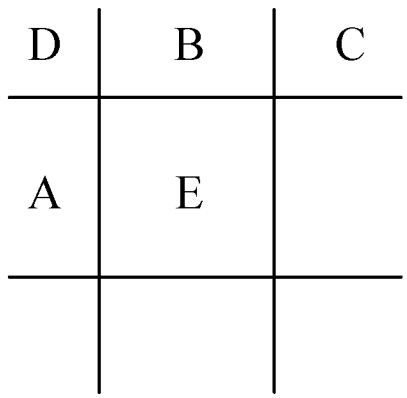
FIG. 8 is a schematic diagram of a positional relationship between a current prediction block and an adjacent block according to an embodiment of the present disclosure.

Exemplarily, the embodiments of the present disclosure provide a schematic diagram of a positional relationship between a current prediction block and an adjacent block. Referring to FIG. 8, an image block E is a current prediction block, and an image block A, an image block B, an image block C, and an image block D are all adjacent blocks of the current prediction block.

S103. Generate a reference frame mask based on the historical optimal reference frame type, the adjacent block information, the prediction sub-block information, and a frame type corresponding to the current prediction block.

Optimal reference frame types selected by different prediction modes of the same image block may all be the same reference frame type. Thus, in order to reduce the calculation complexity, historical optimal reference frame types may be inherited directly as part of the reference frame mask. In addition, the adjacent block is relatively close to the current prediction block, and the contents thereof may be similar. Thus, a part of the reference frame mask may be generated for the current prediction block based on the reference frame type, motion vector and other information of the adjacent block. Meanwhile, the prediction sub-block is determined using a sub-block division type preceding a current sub-block division type, and is closely related to the current prediction block. Thus, a part of the reference frame mask may also be generated by directly using the prediction sub-block information.

Figure 9:
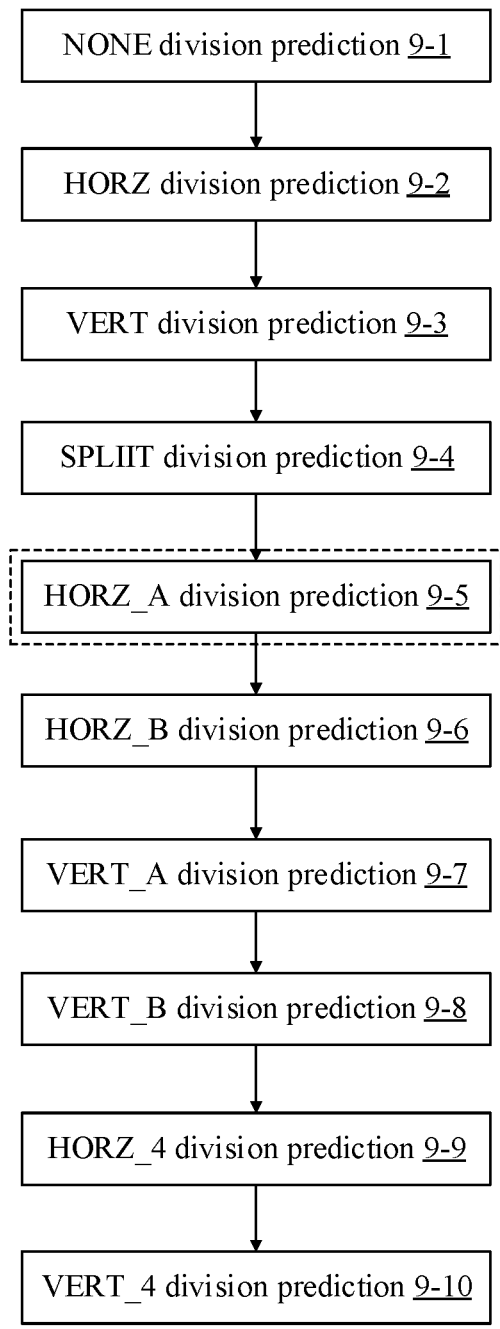
FIG. 9 is a schematic diagram of an order of 10 different sub-block division types according to an embodiment of the present disclosure.

Exemplarily, for the current prediction block, there may be 10 different sub-block division types respectively: NONE division prediction, HORZ division prediction, VERT division prediction, SPLIT division prediction, HORZ_4 division prediction, HORZ_A division prediction, HORZ_B division prediction, VERT_A division prediction, VERT_B division prediction, and VERT_4 division prediction. The order of these 10 sub-block division types is not fixed, and there may be a combination of various orders. The embodiments of the present disclosure provide a schematic diagram of an order of 10 different sub-block division types. Referring to FIG. 9, the 10 sub-block division types may be performed in an order: NONE division prediction 9-1, HORZ division prediction 9-2, VERT division prediction 9-3, SPLIT division prediction 9-4, HORZ_A division prediction 9-5, HORZ_B division prediction 9-6, VERT_A division prediction 9-7, VERT_B division prediction 9-8, HORZ_4 division prediction 9-9, and VERT_4 division prediction 9-10. When the current sub-block division type is HORZ_A division prediction 9-5, the electronic device may directly acquire prediction sub-block information about prediction sub-blocks corresponding to the sub-block division types: NONE division prediction 9-1, HORZ division prediction 9-2, VERT division prediction 9-3, and SPLIT division prediction 9-4.

S104. Determine a reference frame of the preset prediction mode using the reference frame mask, and perform inter prediction on the current prediction block using the reference frame to obtain a prediction value corresponding to the current prediction block.

After determining the reference frame mask, the electronic device may perform consistency comparison between a candidate reference frame type and the reference frame mask. When the candidate reference frame type is consistent with the reference frame mask, the candidate reference frame type is taken as a reference frame of the current prediction block, and then inter prediction is performed on the current prediction block according to the reference frame, so as to obtain a prediction value corresponding to the current prediction block, until all the candidate reference frame types have been cycled. Thus, the application of the reference frame mask is completed.

In the embodiments of the present disclosure, when a current prediction mode is a preset prediction mode, a historical prediction mode corresponding to the current preset prediction mode is determined, and a historical optimal reference frame type of the current prediction block in the historical prediction mode, information about an adjacent block of the current prediction block in the historical prediction mode, and prediction sub-block information corresponding to a prediction sub-block obtained by partitioning the current prediction block in the historical prediction mode are then acquired, whereby the current prediction block directly inherits various information corresponding to the historical prediction mode which has been performed before the preset prediction mode. Then, in the preset prediction mode, a reference frame mask is generated adaptively for the current prediction block. In this way, considering the characteristics of the preset prediction mode in video coding, the reference frame mask is generated directly using some existing information, thus greatly reducing the calculation complexity and improving the efficiency of video coding.

Figure 10:
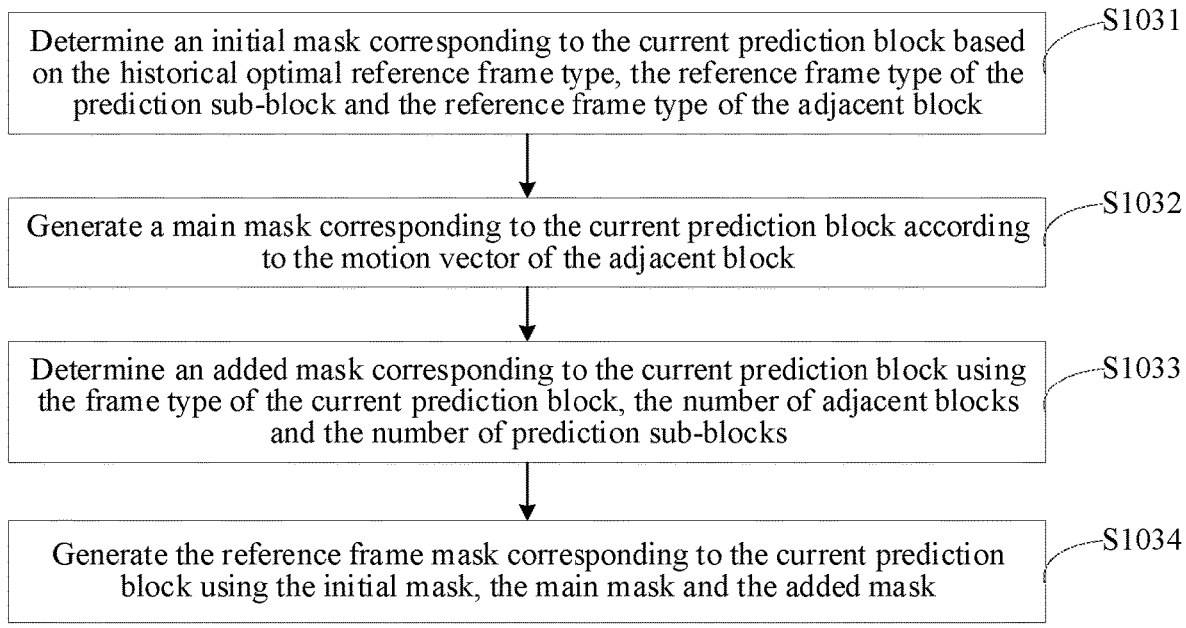
FIG. 10 is an example schematic flowchart 2 of an inter prediction method according to an embodiment of the present disclosure.

In some embodiments of the present disclosure, the adjacent block information includes: a motion vector of the adjacent block, a reference frame type of the adjacent block, and the number of adjacent blocks. The prediction sub-block information includes: a reference frame type of the prediction sub-block and the number of prediction sub-blocks. In this case, referring to FIG. 10, FIG. 10 is an example schematic flowchart 2 of an inter prediction method according to an embodiment of the present disclosure. A reference frame mask is generated based on the historical optimal reference frame type, the adjacent block information, the prediction sub-block information, and a frame type corresponding to the current prediction block. That is, a specific implementation process of S103 may include: the following S1031-S1034:

S1031. Determine an initial mask corresponding to the current prediction block based on the historical optimal reference frame type, the reference frame type of the prediction sub-block and the reference frame type of the adjacent block.

The range of the candidate reference frame types is actually limited. The electronic device firstly determines a selection count of each candidate reference frame type using the reference frame type of the prediction sub-block and the reference frame type of the adjacent block, and then selects an appropriate reference frame type of the current prediction block in a preset prediction mode from each candidate reference frame type based on the selection count. Meanwhile, since the most appropriate reference frame types of the current prediction block in different prediction modes may be the same, the electronic device may also directly inherit a historical optimal reference frame type, i.e. a reference frame type most matched when the current prediction block is in a historical prediction mode. The electronic device determines the selected appropriate reference frame type and the inherited historical optimal reference frame type as an initial mask of the current prediction block.

S1032. Generate a main mask corresponding to the current prediction block according to the motion vector of the adjacent block.

The electronic device constructs an error situation when predicting using each candidate reference frame type according to the motion vector of the adjacent block, determines a candidate reference frame type with a smaller error generated when predicting the current prediction block from each candidate reference frame type according to the error situation, and then takes the candidate reference frame type as a main mask corresponding to the current prediction block.

It is to be understood that in some embodiments of the present disclosure, the electronic device may also classify the respective candidate reference frame types into, for example, a forward reference category, a backward reference category and a long-term reference category, select the most appropriate candidate reference frame type in each reference category, and then generate a main mask corresponding to the current prediction block using the selected candidate reference frame type.

S1033. Determine an added mask corresponding to the current prediction block using the frame type of the current prediction block, the number of adjacent blocks and the number of prediction sub-blocks.

In addition to determining the initial mask and the main mask, the electronic device also needs to determine an added mask for the current prediction block so as to ensure the quality of a finally determined reference frame mask using the added mask when both the initial mask and the main mask are not effective. The electronic device firstly determines a threshold using a frame type of the current prediction block, calculates the number of inter prediction blocks using the number of adjacent blocks and the number of prediction sub-blocks, and then compares the number of inter prediction blocks with the determined threshold so as to determine whether to use some candidate reference frame types as an added mask. In this way, the electronic device completes the generation of the added mask.

S1034. Generate the reference frame mask corresponding to the current prediction block using the initial mask, the main mask and the added mask.

In some embodiments, after obtaining the initial mask, the main mask and the added mask, the electronic device integrates the initial mask, the main mask and the added mask into a set. The set constitutes a reference frame mask of the current prediction block in the prediction mode.

Exemplarily, when the initial mask is represented by mask_init, the main mask is represented by mask_main and the added mask is represented by mask_add, the reference frame mask may be represented as mask_newmv=mask_init|mask_main|mask_add (| represents a union).

In other embodiments, the electronic device may also fuse the initial mask, the main mask and the added mask to obtain a reference frame mask corresponding to the current prediction block.

In the embodiments of the present disclosure, the electronic device may respectively generate a main mask, an initial mask and an added mask for a current prediction block using information and parameters obtained by inheritance, and then integrate the three masks together to obtain a reference frame mask corresponding to the current prediction block, whereby a reference frame is determined subsequently using the reference frame mask.

In some embodiments of the present disclosure, an initial mask corresponding to the current prediction block is determined based on the historical optimal reference frame type, the reference frame type of the prediction sub-block and the reference frame type of the adjacent block. That is, a specific implementation process of S1031 may include: the following S1031a-S1031c:

S1031a. Determine a first initial mask according to the reference frame type of the prediction sub-block and the reference frame type of the adjacent block.

The electronic device may determine candidate reference frame types selected as the prediction sub-block and the adjacent block from all the candidate reference frame types according to the reference frame type of the prediction sub-block and the reference frame type of the adjacent block, determine the selected candidate reference frame types according to the selection count of the selected candidate reference frame types, and then determine whether the first initial mask is the selected reference frame type or a null mask.

S1031b. Take the historical optimal reference frame type as a second initial mask.

The electronic device directly inherits the historical optimal reference frame type and takes the optimal reference frame type as a second initial mask. It is to be understood that when the historical prediction modes are NEARESTMV, NEARMV and GLOBALMV modes, the electronic device may sequentially compare values of optimal reference frame types of the three modes (the optimal reference frame types all belong to the seven reference frame types given in Table 1) with 0. When the value of the optimal reference frame type of a certain mode is greater than 0, the optimal reference frame type of the certain mode is added to the second initial mask.

Exemplarily, when the value of the optimal reference frame type corresponding to the NEARESTMV mode is greater than 0, the optimal reference frame type under the NEARESTMV mode is added to the second initial mask.

S1031c. Determine the initial mask corresponding to the current prediction block using the first initial mask and the second initial mask.

In some embodiments, after obtaining the first initial mask and the second initial mask, the electronic device gathers the first initial mask and the second initial mask together to obtain a set as the initial mask of the current prediction block.

Exemplarily, when the first initial mask is represented by mask_init1 and the second initial mask is represented by mask_init2, the initial mask may be represented as mask_init=mask_init1|mask_init2.

In other embodiments, the electronic device may also weight the first initial mask and the second initial mask to obtain the initial mask corresponding to the current prediction block.

In other embodiments of the present disclosure, the electronic device may firstly determine a part of the initial mask using the reference frame type of the prediction sub-block and the reference frame type of the adjacent block, and then take the historical optimal reference mask as another part of the initial mask. The determination process of the initial mask is implemented by integrating the two parts together.

In the embodiments of the present disclosure, a first initial mask is determined according to the reference frame type of the prediction sub-block and the reference frame type of the adjacent block, and the historical optimal reference frame type is inherited as a second initial mask. Then, the first initial mask and the second initial mask are integrated into an initial mask. Thus, the electronic device implements the determination process of the initial mask.

In some embodiments of the present disclosure, a first initial mask is determined according to the reference frame type of the prediction sub-block and the reference frame type of the adjacent block. That is, a specific implementation process of S1031a may include: the following S201-S203:

S201. Determine at least one historical selected reference frame type using the reference frame type of the adjacent block and the reference frame type of the prediction sub-block.

Since the reference frame type of the adjacent block and the reference frame type of the prediction sub-block are actually determined from all the candidate reference frame types, the electronic device may combine the reference frame type of the adjacent block and the reference frame type of the prediction sub-block to determine candidate reference frame types selected in the historical prediction mode from all the candidate reference frame types, thus determining the selected candidate reference frame types in the historical prediction mode as historical selected reference frame types. Since more than one candidate reference frame type is likely to be selected, the electronic device may obtain at least one historical selected reference frame type.

S202. Calculate a selection count of each historical selected reference frame type in the at least one historical selected reference frame type.

After obtaining at least one historical selected reference frame type, the electronic device calculates a selection count of each historical selected reference frame type in the historical prediction mode, so as to obtain the selection count of each historical selected reference frame type.

In some embodiments, when calculating a selection count of historical selected reference frames, the electronic device calculates a count of each historical selected reference frame serving as the reference frame type of the prediction sub-block and a count of each historical selected reference frame serving as the reference frame type of the adjacent block, respectively, and then adds the two counts for each historical selected reference frame type to obtain the selection count of each historical selected reference frame type.

Exemplarily, LAST_FRAME is a historical selected reference frame type. LAST_FRAME is selected for three times by the prediction sub-block and two times by the adjacent block. Then, LAST_FRAME is selected for five times.

In other embodiments, when calculating a selection count of historical selected reference frames, the electronic device may average the count of each historical selected reference frame serving as the reference frame type of the prediction sub-block and the count of each historical selected reference frame serving as the reference frame type of the adjacent block to obtain the selection count of each historical selected reference frame type.

S203. Select a first initial mask from historical selected reference frame types using the selection counts.

The electronic device may sort the selection counts of the respective historical selected reference frame types so as to determine an order of the selection counts of the respective historical selected reference frame types, and then select the historical selected reference frame type corresponding to the maximum selection count as a first initial mask. The electronic device may also compare the selection count of each historical selected reference frame type with a set threshold, and take the historical selected reference frame type with the selection count greater than the set threshold as a first initial mask.

In the embodiments of the present disclosure, the electronic device may firstly determine that at least one historical selected reference frame type is provided, and then select a first initial mask from each historical selected reference frame type according to the selection count of each historical reference frame type. Thus, the historical selected reference frame type selected by most adjacent blocks and prediction sub-blocks is taken as the first initial mask, so that the first initial mask is more accurate.

In some embodiments of the present disclosure, a first initial mask is selected from historical selected reference frame types using the selection count. That is, a specific implementation process of S203 may include: the following S2031-S2034:

S2031. Determine a maximum selection count from the selection counts of the respective historical selected reference frame types.

S2032. Amplify the selection count of each historical selected reference frame type to obtain an amplified selection count.

It is to be understood that the electronic device may amplify the selection count according to a preset multiple or may amplify the selection count according to a random multiple.

By amplifying the selection count according to a preset multiple, a reference frame may be selected from each historical selected reference frame type as much as possible. That is, as long as the selection count of a certain historical selected reference frame type reaches a certain degree, it is possible to serve as a reference frame mask. The reference frame mask may be selected as a first initial mask by a method for amplifying according to a preset multiple so as to be added to the reference frame mask.

It is to be understood that the preset multiple may be set to 4 or 6 or other values as required. This is not limited in the present disclosure herein.

S2033. Compare the amplified selection count with the maximum selection count to obtain a comparison result corresponding to each historical selected reference frame type.

The comparison result characterizes whether the amplified selection count is greater than or equal to the maximum selection count.

S2034. Take a historical selected reference frame type corresponding to the comparison result characterizing that the amplified selection count is greater than or equal to the maximum selection count as the first initial mask.

The electronic device compares the amplified selection count with the selected maximum selection count, so as to judge a size relationship between the amplified selection count of each historical selected reference frame type and the maximum selection count of all the historical selected reference frame types, and takes the historical selected reference frame type with the amplified selection count greater than or equal to the maximum selection count as the first initial mask.

Exemplarily, the selection count of each historical selected reference frame type may be represented by ref_num[i], the maximum selection count may be represented by ref_num[0] (ranked first after size sorting), and the preset multiple is 4. Then, when ref_num[i]*4≥ref_num[0], mask_init1|=(1<<i) (that is, a frame number i of a historical selected reference frame satisfying the condition is stored into a string for recording the first initial mask).

In the embodiments of the present disclosure, the electronic device may amplify the selection count of each historical selected reference frame type and compare the selection count with a maximum selection count, thus selecting a first initial mask from each historical selected reference frame type for subsequent generation of an initial mask.

In some embodiments of the present disclosure, there is a case where no sub-prediction information and adjacent block information are collected (that is, the sub-prediction information and the adjacent block information are null information). Thus, the reference frame type of the prediction sub-block and the reference frame type of the adjacent block are both null, so that the first initial mask is null, and the second initial mask is also null when no historical optimal reference frame type is collected (for example, the prediction of NEARESTMV, NEARMV and GLOBALMV modes is not performed before the NEWMV mode). At this moment, the initial mask is null. In this case, after constituting the initial mask of the current prediction block using the first initial mask and the second initial mask, i.e. after S1031c, the method may further include: the following S1031d:

S1031d. Add at least one preset reference frame type to the initial mask to obtain a corrected initial mask.

When the initial mask is null, the electronic device may correct and supplement the initial mask in order to ensure the validity of the final reference frame mask. At this moment, the electronic device may add at least one preset reference frame type that has been set to the null initial mask. Thus, the initial mask added with the at least one preset reference frame type is denoted as the corrected initial mask. In this case, the reference frame mask corresponding to the current prediction block is generated using the initial mask, the main mask and the added mask. That is, an implementation process of S1034 will be: generating the reference frame mask corresponding to the current prediction block using the corrected initial mask, the main mask and the added mask.

At least one preset reference frame type may be a selected candidate reference frame type, such as LAST_FRAME, BWDREF_FRAME or ALTREF_FRAME, and may also be a certain video frame to be selected from video frames, such as a first video frame. This is not limited in the present disclosure herein.

It is to be understood that at least one preset reference frame type may include only one preset reference frame type, for example, only LAST_FRAME, or may include three preset reference frame types, for example, LAST_FRAME, BWDREF_FRAME and ALTREF_FRAME. This is not limited in the present disclosure herein.

In the embodiments of the present disclosure, the electronic device may also add at least one preset reference frame type to the initial mask when the initial mask is null, so as to realize the correction and supplement of the initial mask to ensure the validity of the final reference frame mask.

In some embodiments of the present disclosure, the adjacent block information includes: a reference frame type of the adjacent block. The prediction sub-block information includes: a reference frame type of the prediction sub-block. Adjacent block information about an adjacent block of the current prediction block and prediction sub-block information about a prediction sub-block are acquired. That is, a specific implementation process of S102 may include: the following S1021-S1023:

S1021. Judge an optimal prediction mode of the adjacent block to obtain a first judgment result, and judge an optimal prediction mode of the prediction sub-block to obtain a second judgment result.

The first judgment result characterizes whether the optimal prediction mode of the adjacent block is a first preset mode, and the second judgment result characterizes whether the optimal prediction mode of the prediction sub-block is a second preset mode.

S1022. Acquire the reference frame type of the adjacent block when the first judgment result characterizes that the optimal prediction mode of the adjacent block is the first preset mode.

S1023. Acquire the reference frame type of the prediction sub-block when the second judgment result characterizes that the optimal prediction mode of the prediction sub-block is the second preset mode.

When acquiring the adjacent block information corresponding to the adjacent block, the electronic device firstly judges an optimal prediction mode of the adjacent block, and records the reference frame type of the adjacent frame only when it is judged that the optimal prediction mode of the adjacent block is a first preset mode. Similarly, the electronic device records the reference frame type of the prediction sub-block only when it is judged that the optimal prediction mode of the prediction sub-block is a second preset mode, thus acquiring the adjacent block information and the prediction sub-block information in this way. When the optimal prediction mode of the adjacent block is not the first preset mode, the reference frame type of the adjacent frame is null, and when the optimal prediction mode of the prediction sub-block is not the second preset mode, the reference frame type of the prediction sub-block is null.

The first preset mode may be a NEARMV mode and may also be a NEARESTMV mode, and the second preset mode may be a NEARESTMV mode and may also be a NEARMV mode. This is not limited in the present disclosure herein.

Exemplarily, when adjacent blocks are four adjacent blocks shown in FIG. 8 and an optimal prediction mode of each adjacent block is an inter mode, the electronic device may record a reference frame type of the adjacent block to obtain ref_nb[4]={ref_A, ref_B, ref_C, ref_D}, thus obtaining adjacent block information.

In the embodiments of the present disclosure, the electronic device may acquire a reference frame type of the adjacent block and a reference frame type of the prediction sub-block only when the optimal prediction modes of the adjacent block and the prediction sub-block satisfy the condition, thus realizing the acquisition process of the adjacent block information and the prediction sub-block information.

In some embodiments of the present disclosure, a main mask corresponding to the current prediction block is generated according to the motion vector of the adjacent block. That is, a specific implementation process of S1032 may include: the following S1032a-S1032d:

S1032a. Calculate a selection parameter for each candidate reference frame type in complete group of candidate reference frame types using the motion vector of the adjacent block.

The complete group of candidate reference frame types characterize all available reference frame types in inter prediction. In some embodiments of the present disclosure, the complete group of candidate reference frame types may be the seven reference frame types given in Table 1, or several reference frame types selected from the seven reference frame types. The selection parameter characterizes a difference between an input value and a prediction value of the adjacent block, and the difference may be calculated using SAD or SATD. SATD is more accurate, but the calculation complexity is correspondingly higher.

S1032b. Respectively divide the complete group of candidate reference frame types into candidate forward reference frame types, candidate backward reference frame types and candidate long-term reference frame types.

The electronic device divides, according to a reference direction of each candidate reference frame type, the complete group of candidate reference frame types into three groups: candidate forward reference frame types, candidate backward reference frame types and candidate long-term reference frame types, so as to facilitate the subsequent selection process of the reference frame types from the three groups respectively. That is, a forward reference frame type, a backward reference frame type and a long-term reference frame type are selected from the three groups respectively.

Exemplarily, when the complete group of candidate reference frame types are the seven candidate reference frame types provided in Table 1, the electronic device divides LAST_FRAME, LAST_FRAME2 and LAST3_FRAME into candidate forward reference frame types, divides BWDREF_FRAME, ALTREF2_FRAME and ALTREF_FRAME into candidate backward reference frame types, and divides GOLDEN_FRAME into candidate long-term reference frame types according to the reference direction of each candidate reference frame type.

S1032c. Select a forward reference frame type, a backward reference frame type and a long-term reference frame type using the selection parameters corresponding to the candidate forward reference frame types, the selection parameters of the candidate backward reference frame types and the selection parameters corresponding to the candidate long-term reference frame types.

S1032d. Integrate the main mask corresponding to the current prediction block using the forward reference frame type, the backward reference frame type and the long-term reference frame type.

The electronic device performs size comparison on the selection parameters of the candidate reference frame types in each group, and selects a forward reference frame type from the candidate forward reference frame types, a backward reference frame type from the candidate backward reference frame types, and a long-term reference frame type from the candidate long-term reference frame types, according to the comparison result. Then, the electronic device gathers the selected forward reference frame type, backward reference frame type and long-term reference frame type in one set. The set obtained is the main mask.

In other embodiments, the electronic device may also perform weighted fusion on the forward reference frame type, the backward reference frame type and the long-term reference frame type to obtain the main mask of the current prediction block.

Exemplarily, when the forward reference frame type is represented by ref_list0, the backward reference frame type is represented by ref_list1, and the long-term reference frame type is GOLDEN_FRAME, the main mask satisfies: mask_main=ref_list0|ref_list1|GOLDEN_FRAME.

In the embodiments of the present disclosure, the electronic device may calculate a selection parameter for each candidate reference frame type according to a motion vector of an adjacent block, and then select a forward reference frame type, a backward reference frame type and a long-term reference frame type from candidate forward reference frame types, candidate backward reference frame types and candidate long-term reference frame types which are obtained by dividing complete group of candidate reference frame types according to a reference direction based on the selection parameter, so as to integrate the selected reference frame types into a main mask.

In some embodiments of the present disclosure, a forward reference frame type, a backward reference frame type and a long-term reference frame type are selected using the selection parameters corresponding to the candidate forward reference frame types, the selection parameters of the candidate backward reference frame types and the selection parameters corresponding to the candidate long-term reference frame types. That is, a specific implementation process of S1032c may include: the following S301-S303:

S301. Take a candidate reference frame type with the minimum selection parameter from the candidate forward reference frame types as the forward reference frame type.

The electronic device compares the selection parameters of the respective candidate reference frame types in the candidate forward reference frame types with each other, selects a minimum selection parameter therefrom, and then takes a candidate reference frame type with the minimum selection parameter as the forward reference frame type.

S302. Take a candidate reference frame type with the minimum selection parameter from the candidate backward reference frame types as the backward reference frame type.

The electronic device compares the selection parameters of the respective candidate reference frame types in the candidate backward reference frame types, selects a minimum selection parameter therefrom, and then takes a candidate reference frame type corresponding to the minimum selection parameter in the candidate backward reference frame types as the backward reference frame type.

In the present disclosure, the performing order of S301 and S302 does not affect the selection of the forward reference frame type and the backward reference frame type. Thus, in some embodiments, the electronic device may perform S302 and S301 sequentially, or perform S301 and S302 simultaneously.

S303. Take a candidate reference frame type with the selection parameter less than the sum of the selection parameter corresponding to the forward reference frame type and the selection parameter corresponding to the backward reference frame type as the long-term reference frame type.

The electronic device sums the selection parameter of the previously selected forward reference frame type and the selection parameters of the candidate reference frame types to obtain a summation result, and then compares the selection parameters of the respective candidate reference frame types in the candidate long-term reference frame types with the summation result, thus selecting a candidate reference frame type in the candidate long-term reference frame types with the selection parameter less than the summation result as the long-term reference frame type.

Exemplarily, when the selection parameter of the forward reference frame type is represented by sad_list0, the selection parameter of the backward reference frame type is represented by sad_list1, and there is only one candidate reference frame type GLODEN_FRAME in the candidate long-term reference frame types, if the selection parameter of GLODEN_FRAME is less than sad_list0+sad_list1, GLODEN_FRAME is taken as the long-term reference frame type.

In the embodiments of the present disclosure, the electronic device may respectively find out the minimum selection parameters of the candidate forward reference frame types and the candidate backward reference frame types so as to determine a forward reference frame type and a backward reference frame type, and then select a long-term reference frame type from the candidate long-term reference frame types according to the sum of a selection parameter of the forward reference frame type and a selection parameter of the backward reference frame type. In this way, the electronic device may select the forward reference frame type, the backward reference frame type and the long-term reference frame type.

In some embodiments of the present disclosure, a selection parameter is calculated for each candidate reference frame type in complete group of candidate reference frame types using the motion vector of the adjacent block. That is, a specific implementation process of S1032a may include: the following S401-S403. In some embodiments steps S401-S403 may be implemented for each candidate reference frame type.

S401. Match one candidate reference frame type in the complete group of candidate reference frame types with the motion vector of the adjacent block to obtain a matching result.

The matching result characterizes whether there is a matched motion vector in the candidate reference frame type.

There is a correspondence between the motion vector of the adjacent block and the reference frame type of the adjacent block, and the electronic device may judge a certain candidate reference frame type and match the candidate reference frame type with the reference frame type of the adjacent block, thus judging whether the reference frame type of the adjacent block is the same as the candidate reference frame type. If yes, the electronic device considers that the candidate reference frame type is matched with the motion vector of the adjacent block, i.e. there is a matched motion vector. According to this process, the electronic device divides the motion vector of the adjacent block under the respective candidate reference frame types, thus obtaining a matching result for each candidate reference frame type.

After matching, some of the candidate reference frame types may have matched motion vectors, while some of the candidate reference frame types do not have matched motion vectors. Thus, a matching result is needed to record these cases.

S402. Take a preset value as the selection parameter of the candidate reference frame type when the matching result characterizes that there is no matched motion vector in the candidate reference frame type.

When the matching result shows that if a certain candidate reference frame type does not have a matched motion vector, the electronic device will initialize a selection parameter of the candidate reference frame type, i.e. use a preset value as a selection parameter of the candidate reference frame type.

It is to be understood that the preset value may be INT32_MAX, i.e. a maximum number of 32 bits, or a binary representation of 50000. This is not limited in the present disclosure herein.

S403. Calculate the selection parameter of the candidate reference frame type using a prediction value and an input value of the adjacent block in prediction based on the motion vector of the adjacent block when the matching result characterizes that there is a matched motion vector in the candidate reference frame type.

When the matching result of a certain candidate reference frame type shows that there is a matched motion vector of the candidate reference frame type, the electronic device may calculate a selection parameter for each candidate reference frame type using a prediction value of the adjacent block obtained by using the motion vector of the adjacent block for prediction and an input value of the adjacent block.

In some embodiments of the present disclosure, there may be a plurality of matched motion vectors. At this moment, these matched motion vectors may all be regarded as sub-vectors, and the matched motion vectors are taken as a common term. Thus, the matched motion vector includes a plurality of sub-vectors, and each sub-vector corresponds to a prediction value, and the prediction value corresponding to each sub-vector is denoted as a sub-prediction value. Thus, the prediction value includes a plurality of sub-prediction values, and the plurality of sub-vectors and the plurality of sub-prediction values correspond to each other. At this moment, the selection parameter of each candidate reference frame type is calculated using a prediction value and an input value of the adjacent block in prediction based on the motion vector of the adjacent block. That is, a specific implementation process of S403 may include: the following S4031-S4033:

S4031. Calculate a difference value between a pixel of the sub-prediction value corresponding to each sub-vector in the plurality of sub-vectors and a pixel of the input value of the adjacent block to obtain a pixel difference value corresponding to each sub-vector.

S4032. Accumulate absolute values of the pixel difference values corresponding to the respective sub-vectors to obtain a temporary selection parameter corresponding to each sub-vector.

Exemplarily, embodiments of the present disclosure provide a manner of calculating temporary selection parameters, referring to Formula (2):

$$sad = \Sigma_{i=0}^{m} \Sigma_{j=0}^{n} |dst(i,j) - src(i,j)| \qquad (2)$$

where (i, j) is a pixel, (m, n) is the size of an adjacent block, dst(i, j) is a prediction value when a candidate reference frame type predicts using a certain sub-vector, src(i, j) is an input value of the adjacent block, and sad is a calculated temporary selection parameter.

S4033. Take the minimum temporary selection parameter among the temporary selection parameters of the respective sub-vectors as the selection parameter corresponding to the candidate reference frame type.

The electronic device selects, for each candidate reference frame type, the minimum temporary selection parameter from the temporary selection parameters in each sub-vector, and takes the minimum temporary selection parameter as the final selection parameter. Thus, the electronic device calculates the selection parameter of each candidate reference frame type.

In some embodiments of the present disclosure, each candidate reference frame type in the complete group of candidate reference frame types is matched with the motion vector of the adjacent block to obtain a matching result. That is, a specific implementation process of S401 may include: the following S4011:

S4011. When an adjacent block is available, an optimal prediction mode of the adjacent block is a second preset mode, and a reference frame type of the adjacent block is the same as each candidate reference frame type, determine that there is a matched motion vector for each reference frame type.

When matching each candidate reference frame type with the motion vector of the adjacent block, the electronic device firstly judges whether the adjacent block is available, and judges, when the adjacent block is available, whether the optimal prediction mode of the adjacent block is a second preset mode and whether the reference frame type of the adjacent block is the same as each candidate reference frame type. Since there is a correspondence between the motion vector of the adjacent block and the reference frame type of the adjacent block, when the electronic device judges that the optimal prediction mode of each current adjacent block is actually the second preset mode and the reference frame type of the adjacent block is the same as each candidate reference frame type, the electronic device may consider that the motion vector of the adjacent block corresponding to the reference frame type of the adjacent block is matched with each candidate reference frame type. Thus, there is a matched motion vector for each candidate reference frame type.

In the embodiments of the present disclosure, the electronic device may match the motion vector of the adjacent block with each candidate reference frame type, and calculate a selection parameter for each candidate reference frame type according to whether there is a matched motion vector of each candidate reference frame type. Thus, the electronic device may obtain the selection parameter corresponding to each candidate reference frame type.

In some embodiments of the present disclosure, an added mask corresponding to the current prediction block is determined using the frame type of the current prediction block, the number of adjacent blocks and the number of prediction sub-blocks. That is, a specific implementation process of S1033 may include: the following S1033a-S1033d:

S1033a. Determine a frame type weight corresponding to the current prediction block according to a correspondence between a frame type of the current prediction block and a preset frame type weight.

A video frame to which the current prediction block belongs is determined, and the frame type of each video frame is already determined before prediction. Different frame types have different reference relationships and thus different importance. The importance of video frames referenced by more video frames is higher than the importance of video frames referenced by fewer video frames. The electronic device may determine importance according to the frame type of the video frame corresponding to the current prediction block, and then determine a corresponding frame type weight according to the importance.

Figure 11:
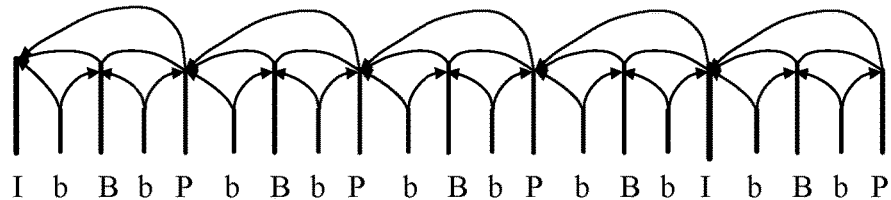
FIG. 11 is a schematic diagram of a reference relationship between an I frame, a P frame, a B frame, a b frame, and a non-reference B frame according to an embodiment of the present disclosure.

Exemplarily, FIG. 11 is a schematic diagram of a reference relationship between an I frame, a P frame, a B frame, a b frame, and a non-reference B frame according to an embodiment of the present disclosure. It can be seen from FIG. 11 that the order of importance determined for these frame types according to the reference relationship is: I frame>P frame>B frame>b frame>non-reference B frame.

Figure 12:
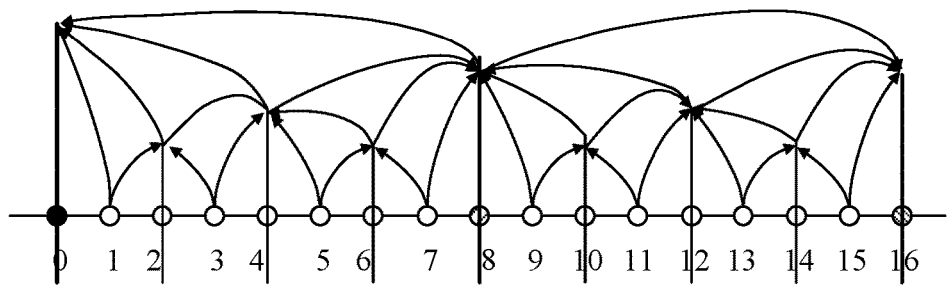
FIG. 12 is a schematic diagram of a reference relationship of GOP16 according to an embodiment of the present disclosure.

In some embodiments, the importance is also related to the structure of a group of pictures (GOP). FIG. 12 is a schematic diagram of a reference relationship of GOP16 according to an embodiment of the present disclosure. It can be seen from FIG. 12 that POC16 refers to POC0. POC8 refers to POC0 and POC16 POC4 refers to POC0 and POC8 POC2 refers to POC0 and POC4. None of the remaining POCs are referenced. Thus, the weight levels shown in Table 2 may be determined, referring to Table 2.

TABLE 2

| Frame type weight | Corresponding poc | Frame type |
|---|---|---|
| 0 | poc0 | I frame |
| 1 | poc16 | P frame/GPB frame |
| 2 | poc8 | B frame |
| 3 | poc4, poc12 | B frame |
| 4 | poc2, poc6, poc10, and poc14 | B frame |
| 5 | poc1, poc3, poc5, poc7, poc9, poc11, poc13, and poc15 | Non-reference B frame |

Thus, the ranking of weights of the respective video frames in GOP16 is: POC0>POC16>POC8>POC4>POC2>POC1.

Thus, the electronic device may select a frame type weight according to the frame type.

S1033b. Generate an added threshold according to the frame type weight.

The electronic device may select a certain number of video frames and then take a frame type weight of the selected video frame as an added threshold, and may set different threshold parameters for different frame type weights and then take the threshold parameter corresponding to the frame type weight of the selected video frame as an added threshold.

Exemplarily, embodiments of the present disclosure provide a formula for generating an added threshold, referring to Formula (3):

$$thr=param[slice\_level] \quad (3)$$

where param is a threshold parameter, the value of param may be self-defined as, for example, param[6]={5, 5, 5, 5, 4, 4}, thr is a generated added threshold, and slice_level is a frame type weight. In this way, the added threshold may be generated by means of table lookup.

S1033c. Sum the number of adjacent blocks and the number of prediction sub-blocks to obtain a sum result.

S1033d. Take at least one preset reference frame type as an added mask corresponding to the current prediction block when the sum result is less than or equal to the added threshold.

The electronic device adds the number of adjacent blocks to the number of prediction sub-blocks to obtain a sum result, and then compares the sum result with the added threshold. When the electronic device finds that the sum result is less than or equal to the added threshold, at least one preset reference frame type may be acquired, and then the at least one preset reference frame type is taken as an added mask. In this way, the electronic device completes the generation process of the added mask.

The at least one preset reference frame type may be LAST_FRAME, BWDREF_FRAME and ALTREF_FRAME, and may also be LAST_FRAME, BWDREF_FRAME and GOLDEN_FRAME. This is not limited in the present disclosure herein.

In the embodiments of the present disclosure, the electronic device may firstly determine a frame type weight according to the frame type of the current prediction block, and then generate an added threshold according to the frame type weight, so as to select whether to add at least one preset reference frame type to an added mask according to a size relationship between the sum of the number of adjacent blocks and the number of prediction sub-blocks and the generated added threshold, thus ensuring the validity of a finally generated reference frame mask.

An exemplary application of the embodiments of the present disclosure in a practical application scenario will be described below.

Figure 13:
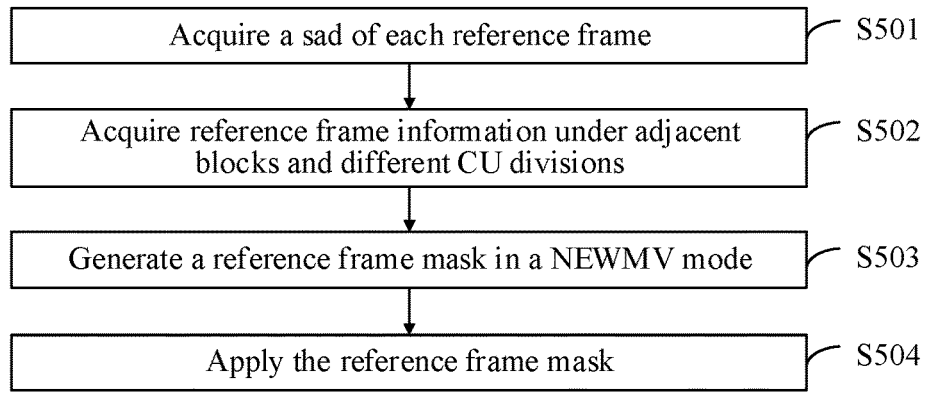
FIG. 13 is a schematic diagram of a process of generating a reference frame mask for a NEWMV mode according to an embodiment of the present disclosure.

The embodiments of the present disclosure are implemented in a scenario where a coder (electronic device) generates a reference frame mask for a NEWMV mode (preset prediction mode). The idea of this process is: Before NEWMV mode prediction, NEARSETMV, NEARMV and GLOBAALMV have been determined, and optimal reference frames of these modes and information about adjacent blocks and different predicted CU divisions may be inherited. According to adjacent MVs of each reference frame, a SAD corresponding to each MV is calculated, and then the minimum SAD is taken as the SAD of the reference frame. The reference frame is divided into three groups: a forward reference group, a backward reference group and a long-term reference group. Each group selects the reference frame corresponding to the minimum SAD in the group as a reference frame representation of this group, so as to form a main mask of the NEWMV mode. The collected information is then integrated into a final reference frame mask in the NEWMV mode. FIG. 13 is a schematic diagram of a process of generating a reference frame mask for a NEWMV mode according to an embodiment of the present disclosure. Referring to FIG. 13, this process may include:

S501. Determine a sad (selection parameter) of each reference frame (candidate reference frame type).

S502. Acquire reference frame information under an adjacent block and different CU divisions (a prediction sub-block is obtained).

S503. Generate a reference frame mask in a NEWMV mode.

S504. Apply the reference frame mask.

Each step is explained below.

In S501, the coder initializes SAD corresponding to each reference frame to be INT32_MAX (preset value). INT32_MAX is a maximum number of 32 bits. S501 includes three parts:

S5011. Acquire an adjacent block motion vector candidate list.

A positional relationship between a current block (current prediction block) and an adjacent block may be as shown in FIG. 8. The electronic device judges the position of each adjacent block at a time. If the current adjacent block position is available, the optimal mode is inter prediction and the reference frame is the same as the current reference frame (each candidate reference frame type), the current MV is recorded. There may be a plurality of MVs under the reference frame of the current adjacent block or none of the MVs (a matched motion vector is determined for each candidate reference frame type, and the matched motion vector for one candidate reference frame type may have a plurality of sub-vectors).

S5012. Sequentially calculate a SAD (temporary selection parameter) corresponding to each MV (sub-vector).

The coder may calculate the SAD according to Formula (2). Here, it is also possible to calculate the SATD at each MV. SATD is more accurate, but the calculation complexity is higher.

S5013. Select a minimum SAD (minimum temporary selection parameter) corresponding to each reference frame.

Since there may be a plurality of MVs under the current reference frame, a plurality of SADs will be obtained, and the minimum SAD is taken as the SAD of the current reference frame. It is also possible that there is no MV in the current reference frame. At this moment, the SAD of the current reference frame is INT32_MAX (a preset value is taken as the selection parameter of each candidate reference frame type when there is no matched motion vector in each candidate reference frame type).

S502 includes three parts:

S5021. Acquire reference frame information about an adjacent block.

A positional relationship between a current block and an adjacent block is as shown in FIG. 8. If there is an adjacent block and the optimal mode is an inter mode (first preset mode), reference frame information about the adjacent block is recorded (a reference frame type of the adjacent block is acquired, i.e. adjacent block information is acquired).

S5022. Acquire reference frame information under different CU division types.

There are 10 CU division types for the current block, the division is as shown in FIG. 9, and the coding prediction process is performed sequentially in order. Therefore, when the current division type (current sub-block division type) is made, it is possible that other CU division types (previous sub-block division types) have been made. For example, when the current block is in a HORZ_A division type, a NONE division type has been made before, and thus division information about the NONE division type may be used.

Reference frame information (prediction sub-block information) for each sub-block (prediction sub-block) under each determined CU division type is obtained. The judgment method of this process is similar to that of an adjacent block, and if there is a sub-block position and the optimal mode is an inter mode (second preset mode), reference frame information about each sub-block is recorded.

S5023. Arrange data.

The number of inter prediction blocks (a sum result of the number of adjacent blocks and the number of prediction sub-blocks) according to adjacent blocks and different CU divisions is counted as inter_total_num. The collected reference frames (historical selected reference frame types) and the number of each reference frame being selected (selection count) are counted, and the reference frames are sorted in descending order of the selection numbers.

The reference frame mask generated by S503 is denoted as mask_newmv, and is composed of three parts: an initialization mask, a main mask and an added mask, i.e. mask_newmv=mask_init|mask_main|mask_add.

S503 includes the following steps:

S5031. Generate an initialization mask (initial mask).

Figure 14:
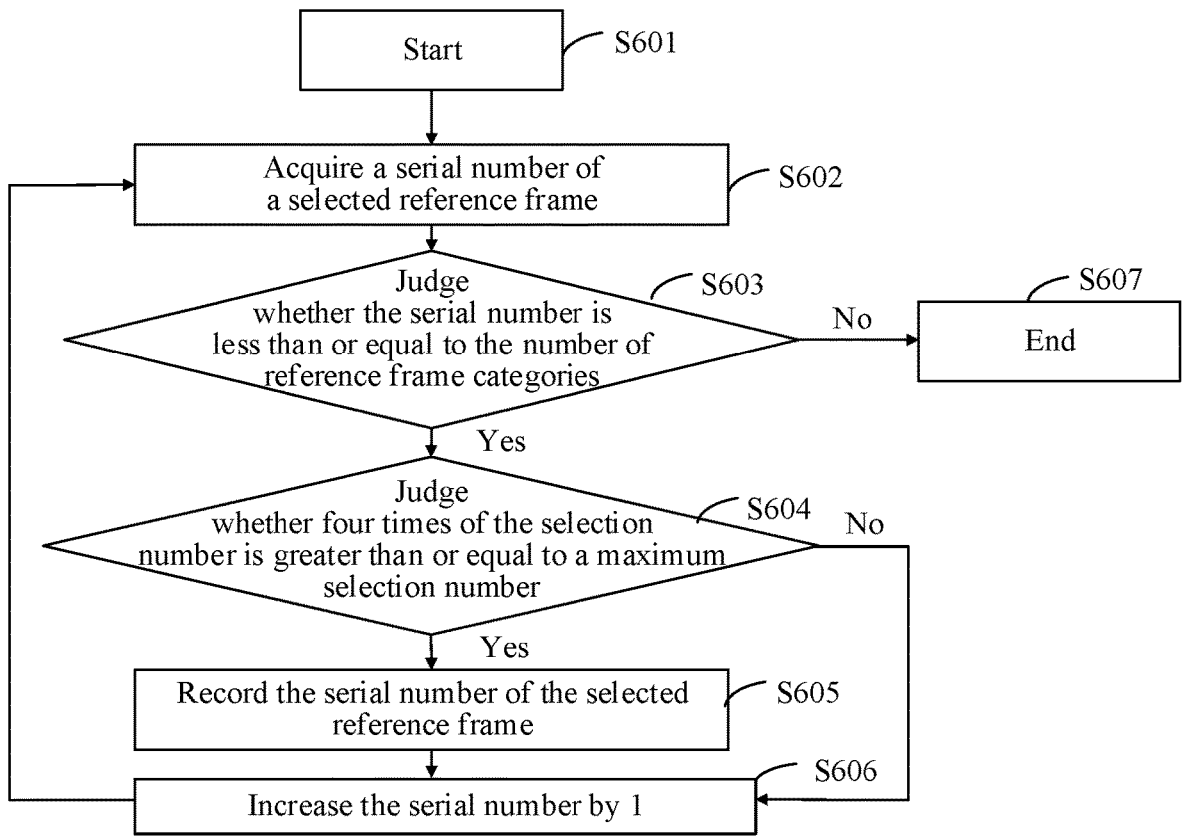
FIG. 14 provides a schematic diagram 1 of a process of generating an initialization mask.

It is denoted as mask_init, and is generated according to the collected reference frame information (i.e. the reference frame type of the adjacent block and the reference frame type of the prediction sub-block). The generation process mainly includes:

S50311. Determine whether to add a current reference frame to the initialization mask according to the reference frame information under adjacent blocks and different CU division types. FIG. 14 provides a schematic diagram 1 of a process of generating an initialization mask. Referring to FIG. 14, this process includes:

S601. Start.

S602. Acquire a serial number of a selected reference frame.

S603. Judge whether the serial number is less than or equal to the number of reference frame categories. The number of reference frame categories refers to the number of categories for judging the reference frame type in the collected reference frame information.

If yes, S604 is performed. If no, S607 is performed.

S604. Judge whether four times of the selection number (amplified selection count) is greater than or equal to a maximum selection number (maximum selection count).

If yes, S605 is performed. If no, S606 is performed.

S605. Record the serial number of the selected reference frame.

S606. Increase the serial number by 1, and re-perform S602.

S607. End.

The serial number of the selected reference frame here is determined in descending order of the selection number of the reference frames. Thus, as the selection number is smaller, the reference value is smaller. If all the reference frames are added to the initialization mask, unnecessary reference frames will be added and the coding speed will be affected.

At this point, the process of S50311 is completed, and the process proceeds to S50312.

S50312. Generate an initialization mask according to the reference frame information of the predicted mode.

Figure 15:
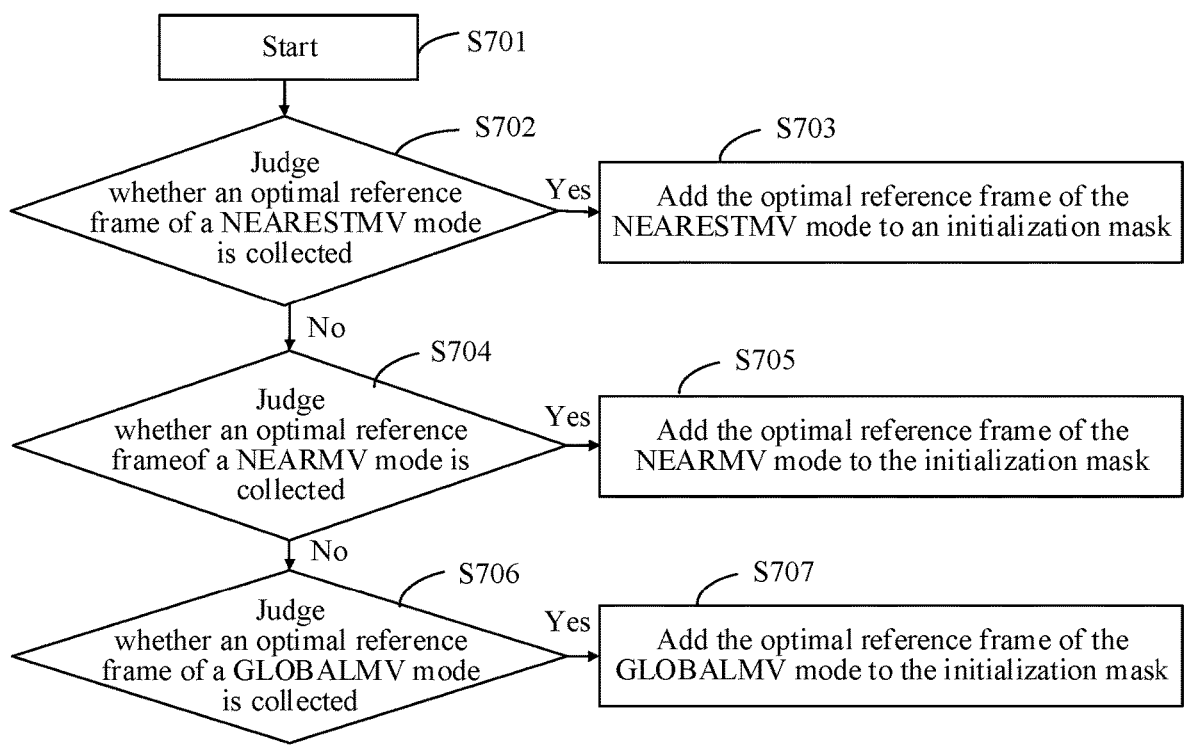
FIG. 15 provides a schematic diagram 2 of a process of generating an initialization mask.

FIG. 15 provides a schematic diagram 2 of a process of generating an initialization mask. Referring to FIG. 15, this process includes:

S701. Start.

S702. Judge whether an optimal reference frame (historical optimal reference frame type) of a NEARESTMV mode is collected.

If yes, S703 is performed. If no, S704 is performed.

S703. Add the optimal reference frame of the NEARESTMV mode to an initialization mask.

S704. Judge whether an optimal reference frame (historical optimal reference frame type) of a NEARMV mode is collected.

If yes, S705 is performed. If no, S706 is performed.

S705. Add the optimal reference frame of the NEARMV mode to the initialization mask.

S706. Judge whether an optimal reference frame (historical optimal reference frame type) of a GLOBALMV mode is collected.

If yes, S707 is performed. If no, S708 is performed.

S707. Add the optimal reference frame of the GLOBALMV mode to the initialization mask.

S708. End.

At this point, the process of S50312 is completed, and the process proceeds to S50313.

S50313. Correct and supplement.

After S50311 and S50312, there may be a case where mask_init is 0 (the initial mask is null). At this moment, values corresponding to LAST_FRAME, BWDREF_FRAME and ALTREF_FRAME (at least one preset reference frame type) may be written into mask_init (for example, the value of LAST_FRAME may be recorded in mask_init by shifting mask_init leftwards by LAST_FRAME bits), thus realizing the addition of these frames into the initialization mask.

Mask_init is 0, possibly since no reference frame information is collected, and no other single reference frame mode has selected the optimal mode. At this moment, LAST_FRAME, BWDREF_FRAME and ALTREF_FRAME need to be compulsorily added.

At this point, the process of generating the initialization mask is completed, and it is required to proceed to S5032, i.e. the process of generating a main mask.

S5032. Generate a main mask.

It is denoted as mask_main, initialized to be 0, and generated according to SAD.

The seven reference frames (complete group of candidate reference frame types) in Table 1 are divided into three types: a forward reference frame, a backward reference frame and a long-term reference frame. The forward reference frame includes LAST_FRAME, LAST2_FRAME and LAST3_FRAME (candidate forward reference frame types). The backward reference frame includes: BWDREF_FRAME, ALTREF2_FRAME and ALTREF_FRAME (candidate backward reference frame types). The long-term reference frame includes GOLDEN_FRAME (candidate long-term reference frame type). A reference frame of each type with the minimum SAD is then found.

The specific flow is as follows:

Step1: Search for a forward reference frame (forward reference frame type).

SADs corresponding to LAST_FRAME, LAST2_FRAME and LAST3_FRAME are compared, a reference frame with the minimum SAD and not being INT32_MAX is found and denoted as ref_list0, and the forward minimum SAD is recorded and denoted as sad_list0.

Step2: Search for a backward reference frame (backward reference frame type).

SADs corresponding to BWDREF_FRAME, ALTREF2_FRAME and ALTREF_FRAME are compared, a reference frame with the minimum SAD and not being INT32_MAX is found and denoted as ref_list1, and the forward minimum SAD is recorded and denoted as sad_list1.

Step3: Search for a long-term reference frame (long-term reference frame type).

If the SAD corresponding to the reference frame GOLDEN_FRAME is not equal to INT32_MAX and is less than sad_list0+sad_list1, the long-term reference frame is GOLDEN_FRAME.

In the above process, if the current reference frame may not have a satisfying MV, the SAD corresponding to such current reference frame is INT32_MAX, indicating that the reference frame is unimportant and may be skipped directly.

At this point, the process of generating the main mask is completed, and it is required to proceed to S5033, i.e. the process of generating an added mask.

S5033. Generate an added mask.

It is denoted as mask_add, initialized to be 0, and related to the frame type weight and the number of inter blocks collected.

Firstly, a threshold thr is generated according to the current frame type weight. The current frame type is already determined before prediction. Thus, the current frame type weight may also be determined, which is denoted as slice_level. Then, the threshold may be generated according to Formula (3).

If inter_total_num<=thr, the values of LAST_FRAME, BWDREF_FRAME, ALTREF_FRAME are written into mask_add (completed by shifting mask_add leftwards).

At this point, the generation of the reference frame mask of the NEWMV mode is completed, and it is required to enter the process of applying a reference frame mask.

S504. Apply a reference frame mask.

Figure 16:
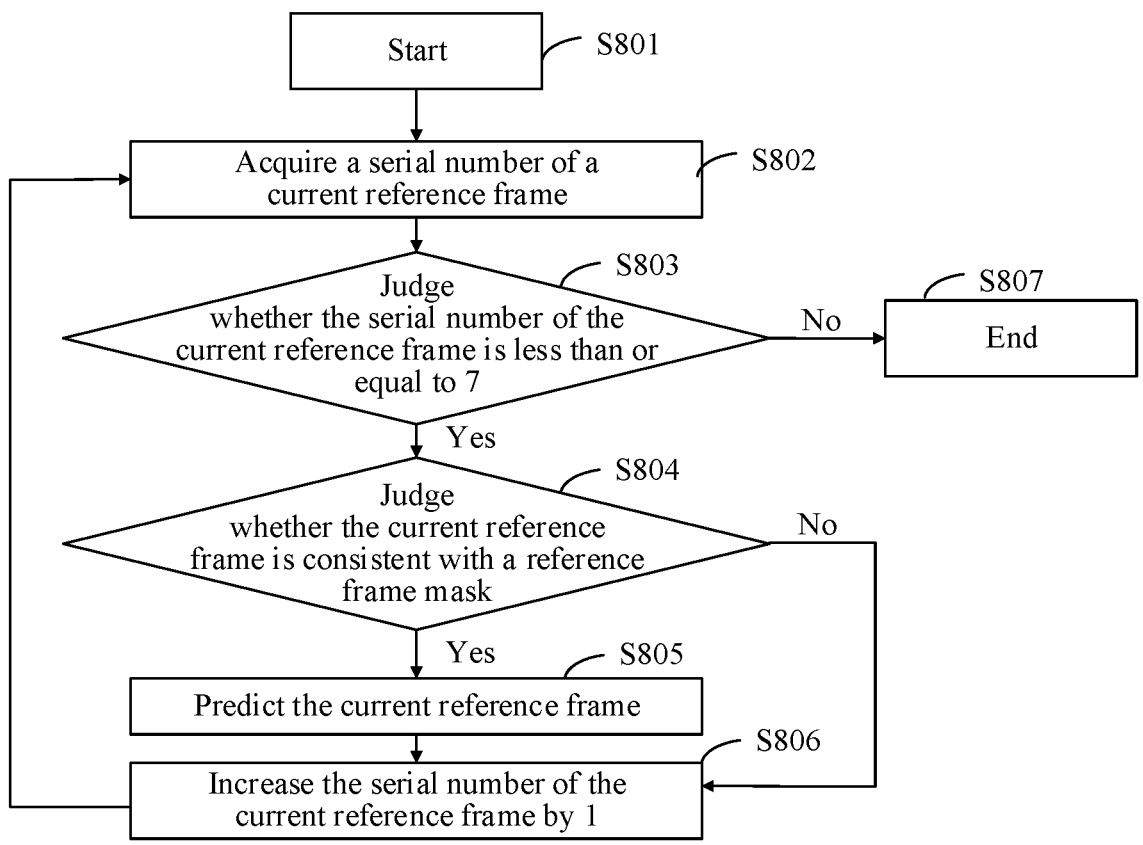
FIG. 16 is a schematic diagram of a process of applying a reference frame mask for a NEWMV mode according to an embodiment of the present disclosure.

All the reference frames are cycled, and it is compared whether the current reference frame is consistent with the reference frame mask. For example, bits 1 and 4 of the reference frame mask mask_newmv are both 1. If the current reference frame is 1 or 4, the current reference frame may be used for prediction. If no, the next reference frame is continuously judged. FIG. 16 is a schematic diagram of a process of applying a reference frame mask for a NEWMV mode according to an embodiment of the present disclosure. Referring to FIG. 16, this process may include:

S801. Start.

S802. Acquire a serial number of a current reference frame.

S803. Judge whether the serial number of the current reference frame is less than or equal to 7.

If yes, S804 is performed. If no, S807 is performed.

S804. Judge whether the current reference frame is consistent with a reference frame mask.

If yes, S805 is performed. If no, S806 is performed.

S805. Predict the current reference frame.

S806. Increase the serial number of the current reference frame by 1, and re-perform S802.

S807. End.

In the above manner, the coder does not introduce a new calculation, takes full account of the characteristics of the NEWMV mode, and directly uses the collected information to generate a reference frame mask. Compared with the coding speed in the related art, the speed can be increased by 15% when coding 65-frame video frames, and the speedup ratio is very high. Moreover, the obtained reference frame mask has a high adaptive capability, and reference frames do not need to be eliminated in the generation process, so that the quality of the bitstream is also ensured.

Continuing with an example structure of an implementation of the inter prediction apparatus 455 according to the embodiments of the present disclosure as a software module, in some embodiments, as shown in FIG. 6, the software module in the inter prediction apparatus 455 stored in the memory 450 may include:

a mode determination module 4551, configured to determine, when a current prediction mode of a current prediction block is a preset prediction mode, a historical prediction mode corresponding to the current prediction block, the historical prediction mode being a prediction mode in which prediction is completed before the preset prediction mode;

an information acquisition module 4552, configured to acquire adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type;

a mask generation module 4553, configured to generate a reference frame mask based on the historical optimal reference frame type, the adjacent block information, the prediction sub-block information, and a frame type corresponding to the current prediction block; and an information prediction module 4554, configured to determine a reference frame of the preset prediction mode using the reference frame mask, and perform inter prediction on the current prediction block using the reference frame to obtain a prediction value corresponding to the current prediction block.

In some embodiments of the present disclosure, the adjacent block information includes: a motion vector of the adjacent block, a reference frame type of the adjacent block, and the number of adjacent blocks. The prediction sub-block information includes: a reference frame type of the prediction sub-block and the number of prediction sub-blocks.

The mask generation module 4553 is further configured to determine an initial mask corresponding to the current prediction block based on the historical optimal reference frame type, the reference frame type of the prediction sub-block and the reference frame type of the adjacent block; generate a main mask corresponding to the current prediction block according to the motion vector of the adjacent block; determine an added mask corresponding to the current prediction block using the frame type of the current prediction block, the number of adjacent blocks and the number of prediction sub-blocks; and generate the reference frame mask corresponding to the current prediction block using the initial mask, the main mask and the added mask.

In some embodiments of the present disclosure, the mask generation module 4553 is further configured to determine a first initial mask according to the reference frame type of the prediction sub-block and the reference frame type of the adjacent block; take the historical optimal reference frame type as a second initial mask; and determine the initial mask corresponding to the current prediction block using the first initial mask and the second initial mask.

In some embodiments of the present disclosure, the mask generation module 4553 is further configured to determine at least one historical selected reference frame type using the reference frame type of the adjacent block and the reference frame type of the prediction sub-block; calculate a selection count of each historical selected reference frame type in the at least one historical selected reference frame type; and select a first initial mask from each historical selected reference frame type using the selection count.

In some embodiments of the present disclosure, the mask generation module 4553 is further configured to determine a maximum selection count from the selection counts of the respective historical selected reference frame types; amplify the selection count of each historical selected reference frame type to obtain an amplified selection count; compare the amplified selection count with the maximum selection count to obtain a comparison result corresponding to each historical selected reference frame type, the comparison result characterizing whether the amplified selection count is greater than or equal to the maximum selection count; and determine a historical selected reference frame type corresponding to the comparison result characterizing that the amplified selection count is greater than or equal to the maximum selection count as the first initial mask.

In some embodiments of the present disclosure, the initial mask is null. The mask generation module 4553 is further configured to add at least one preset reference frame type to the initial mask to obtain a corrected initial mask.

The mask generation module 4553 is further configured to generate the reference frame mask corresponding to the current prediction block using the corrected initial mask, the main mask and the added mask.

In some embodiments of the present disclosure, the adjacent block information includes: a reference frame type of the adjacent block. The prediction sub-block information includes: a reference frame type of the prediction sub-block. The mask generation module 4553 is further configured to judge an optimal prediction mode of the adjacent block to obtain a first judgment result, and judge an optimal prediction mode of the prediction sub-block to obtain a second judgment result, the first judgment result characterizing whether the optimal prediction mode of the adjacent block is a first preset mode, and the second judgment result characterizing whether the optimal prediction mode of the prediction sub-block is a second preset mode; acquire the reference frame type of the adjacent block when the first judgment result characterizes that the optimal prediction mode of the adjacent block is the first preset mode; and acquire the reference frame type of the prediction sub-block when the second judgment result characterizes that the optimal prediction mode of the prediction sub-block is the second preset mode.

In some embodiments of the present disclosure, the mask generation module 4553 is further configured to calculate a selection parameter for each candidate reference frame type in complete group of candidate reference frame types using the motion vector of the adjacent block, the complete group of candidate reference frame types characterizing all available candidate reference frame types in inter prediction, and the selection parameter characterizing a difference between an input value and a prediction value of the adjacent block; respectively divide the complete group of candidate reference frame types into candidate forward reference frame types, candidate backward reference frame types and candidate long-term reference frame types; select a forward reference frame type, a backward reference frame type and a long-term reference frame type using the selection parameters corresponding to the candidate forward reference frame types, the selection parameters of the candidate backward reference frame types and the selection parameters corresponding to the candidate long-term reference frame types; and integrate the main mask corresponding to the current prediction block using the forward reference frame type, the backward reference frame type and the long-term reference frame type.

In some embodiments of the present disclosure, the mask generation module 4553 is further configured to take a candidate reference frame type with the minimum selection parameter from the candidate forward reference frame types as the forward reference frame type; take a candidate reference frame type with the minimum selection parameter from the candidate backward reference frame types as the backward reference frame type; and take a candidate reference frame type with the selection parameter less than the sum of the selection parameter corresponding to the forward reference frame type and the selection parameter corresponding to the backward reference frame type as the long-term reference frame type.

In some embodiments of the present disclosure, the mask generation module 4553 is further configured to match each candidate reference frame type in the complete group of candidate reference frame types with the motion vector of the adjacent block to obtain a matching result, the matching result characterizing whether there is a matched motion vector in each candidate reference frame type; take a preset value as the selection parameter of each candidate reference frame type when the matching result characterizes that there is no matched motion vector in each candidate reference frame type; and calculate the selection parameter of each candidate reference frame type using a prediction value and an input value of the adjacent block in prediction based on the motion vector of the adjacent block when the matching result characterizes that there is a matched motion vector in each candidate reference frame type.

In some embodiments of the present disclosure, the mask generation module 4553 is further configured to calculate a difference value between a pixel of the sub-prediction value corresponding to each sub-vector in the plurality of sub-vectors and a pixel of the input value of the adjacent block to obtain a pixel difference value corresponding to each sub-vector; accumulate absolute values of the pixel difference values corresponding to the respective sub-vectors to obtain a temporary selection parameter corresponding to each sub-vector; and take the minimum temporary selection parameter among the temporary selection parameters of the respective sub-vectors as the selection parameter corresponding to each candidate reference frame type.

In some embodiments of the present disclosure, the mask generation module 4553 is further configured to determine a frame type weight corresponding to the current prediction block according to a correspondence between a frame type of the current prediction block and a preset frame type weight; generate an added threshold according to the frame type weight; sum the number of adjacent blocks and the number of prediction sub-blocks to obtain a sum result; and take at least one preset reference frame type as an added mask corresponding to the current prediction block when the sum result is less than or equal to the added threshold.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The description of the inter prediction apparatus according to the embodiments of the present disclosure is similar to the description of the inter prediction method according to the embodiments of the present disclosure, and the descriptions have similar beneficial effects.

An embodiment of the present disclosure provides a computer program product or a computer program. The computer program product or the computer program includes computer instructions, and the computer instructions are stored in a computer-readable storage medium. A processor of a computer device (an electronic device for inter prediction) reads the computer instructions from the computer-readable storage medium, and executes the computer instructions, to cause the computer device to perform the inter prediction method according to the embodiments of the present disclosure.

An embodiment of the present disclosure provides a computer-readable storage medium storing executable instructions. When the executable instructions are executed by a processor, the processor is caused to perform the inter prediction method according to the embodiments of the present disclosure, such as the method shown in FIG. 7.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely exemplary embodiments of the present disclosure and are not intended to limit the protection scope of the present disclosure. Any modification, equivalent replacement, or improvement made without departing from the spirit and scope of the present disclosure shall fall within the protection scope of the present disclosure.

What is claimed is:

1. An inter prediction method, performed by an electronic device, the method comprising:
    determining, when a current prediction mode of a current prediction block is a preset prediction mode, a historical prediction mode corresponding to the current prediction block, the historical prediction mode being a prediction mode in which prediction is completed before the preset prediction mode;
    acquiring adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type;
    generating a reference frame mask based on the historical optimal reference frame type, the adjacent block information, the prediction sub-block information, and a frame type corresponding to the current prediction block; and determining a reference frame of the preset prediction mode using the reference frame mask, and performing inter prediction on the current prediction block using the reference frame to obtain a prediction value corresponding to the current prediction block.

2. The method according to claim 1, wherein the adjacent block information comprises: a motion vector of the adjacent block, a reference frame type of the adjacent block, and a number of adjacent blocks; the prediction sub-block information comprises: a reference frame type of the prediction sub-block and the number of prediction sub-blocks;

the generating a reference frame mask based on the historical optimal reference frame type, the adjacent block information, the prediction sub-block information, and a frame type corresponding to the current prediction block comprises:

determining an initial mask corresponding to the current prediction block based on the historical optimal reference frame type, the reference frame type of the prediction sub-block and the reference frame type of the adjacent block;

generating a main mask corresponding to the current prediction block according to the motion vector of the adjacent block;

determining an added mask corresponding to the current prediction block using the frame type of the current prediction block, the number of adjacent blocks and the number of prediction sub-blocks; and generating the reference frame mask corresponding to the current prediction block using the initial mask, the main mask and the added mask.

3. The method according to claim 2, wherein the determining an initial mask corresponding to the current prediction block based on the historical optimal reference frame type, the reference frame type of the prediction sub-block and the reference frame type of the adjacent block comprises:

determining a first initial mask according to the reference frame type of the prediction sub-block and the reference frame type of the adjacent block;

taking the historical optimal reference frame type as a second initial mask; and determining the initial mask corresponding to the current prediction block using the first initial mask and the second initial mask.

4. The method according to claim 3, wherein the determining a first initial mask according to the reference frame type of the prediction sub-block and the reference frame type of the adjacent block comprises:

determining at least one historical selected reference frame type using the reference frame type of the adjacent block and the reference frame type of the prediction sub-block;

calculating a selection count of each historical selected reference frame type in the at least one historical selected reference frame type; and selecting a first initial mask from the at least one historical selected reference frame type based on the selection count.

5. The method according to claim 4, wherein the screening out a first initial mask from the at least one historical selected reference frame types based on the selection count comprises:

determining a maximum selection count from the selection counts of the respective historical selected reference frame types;

amplifying the selection count of each historical selected reference frame type to obtain an amplified selection count;

comparing the amplified selection count with the maximum selection count to obtain a comparison result corresponding to each historical selected reference frame type, the comparison result characterizing whether the amplified selection count is greater than or equal to the maximum selection count; and determining a historical selected reference frame type corresponding to the comparison result characterizing that the amplified selection count is greater than or equal to the maximum selection count as the first initial mask.

6. The method according to claim 3, wherein the initial mask is null; the method further comprises:

adding at least one preset reference frame type to the initial mask to obtain a corrected initial mask; and the generating the reference frame mask corresponding to the current prediction block using the initial mask, the main mask and the added mask comprises:

generating the reference frame mask corresponding to the current prediction block using the corrected initial mask, the main mask and the added mask.

7. The method according to claim 1, wherein the adjacent block information comprises: a reference frame type of the adjacent block; the prediction sub-block information comprises: a reference frame type of the prediction sub-block; the acquiring adjacent block information about an adjacent block of the current prediction block and prediction sub-block information about a prediction sub-block comprises:

judging an optimal prediction mode of the adjacent block to obtain a first judgment result, and judging an optimal prediction mode of the prediction sub-block to obtain a second judgment result, the first judgment result characterizing whether the optimal prediction mode of the adjacent block is a first preset mode, and the second judgment result characterizing whether the optimal prediction mode of the prediction sub-block is a second preset mode;

acquiring the reference frame type of the adjacent block when the first judgment result characterizes that the optimal prediction mode of the adjacent block is the first preset mode; and acquiring the reference frame type of the prediction sub-block when the second judgment result characterizes that the optimal prediction mode of the prediction sub-block is the second preset mode.

8. The method according to claim 2, wherein the generating a main mask corresponding to the current prediction block according to the motion vector of the adjacent block comprises:

calculating a selection parameter for a candidate reference frame type in a complete group of candidate reference frame types using the motion vector of the adjacent block, the complete group of candidate reference frame types including available candidate reference frame types in inter prediction, and the selection parameter characterizing a difference between an input value and a prediction value of the adjacent block;

respectively dividing the complete group of candidate reference frame types into candidate forward reference frame types, candidate backward reference frame types and candidate long-term reference frame types;

selecting a forward reference frame type, a backward reference frame type and a long-term reference frame type using the selection parameters corresponding to the candidate forward reference frame types, the selection parameters of the candidate backward reference frame types and the selection parameters corresponding to the candidate long-term reference frame types; and integrating the main mask corresponding to the current prediction block using the forward reference frame type, the backward reference frame type and the long-term reference frame type.

9. The method according to claim 8, wherein the selecting a forward reference frame type, a backward reference frame type and a long-term reference frame type using the selection parameters corresponding to the candidate forward reference frame types, the selection parameters of the candidate backward reference frame types and the selection parameters corresponding to the candidate long-term reference frame types comprises:

taking a candidate reference frame type with the minimum selection parameter from the candidate forward reference frame types as the forward reference frame type;

taking a candidate reference frame type with the minimum selection parameter from the candidate backward reference frame types as the backward reference frame type; and taking a candidate reference frame type with the selection parameter less than the sum of the selection parameter corresponding to the forward reference frame type and the selection parameter corresponding to the backward reference frame type as the long-term reference frame type.

10. The method according to claim 8, wherein the calculating a selection parameter for the candidate reference frame type in complete group of candidate reference frame types using the motion vector of the adjacent block comprises:

matching the candidate reference frame type in the complete group of candidate reference frame types with the motion vector of the adjacent block to obtain a matching result, the matching result characterizing whether there is a matched motion vector in the candidate reference frame type;

taking a preset value as the selection parameter of the candidate reference frame type when the matching result characterizes that there is no matched motion vector in the candidate reference frame type; and calculating the selection parameter of the candidate reference frame type using a prediction value and an input value of the adjacent block in prediction based on the motion vector of the adjacent block when the matching result characterizes that there is a matched motion vector in the candidate reference frame type.

11. The method according to claim 10, wherein the matched motion vector comprises a plurality of sub-vectors, the prediction value comprises a plurality of sub-prediction values, and the plurality of sub-vectors and the plurality of sub-prediction values correspond to each other; the calculating the selection parameter of the candidate reference frame type using a prediction value and an input value of the adjacent block in prediction based on the motion vector of the adjacent block comprises:

calculating a difference value between a pixel of the sub-prediction value corresponding to each sub-vector in the plurality of sub-vectors and a pixel of the input value of the adjacent block to obtain a pixel difference value corresponding to each sub-vector;

accumulating absolute values of the pixel difference values corresponding to the respective sub-vectors to obtain a temporary selection parameter corresponding to each sub-vector; and taking the minimum temporary selection parameter among the temporary selection parameters of the respective sub-vectors as the selection parameter corresponding to the candidate reference frame type.

12. The method according to claim 2, wherein the determining an added mask corresponding to the current prediction block using the frame type of the current prediction block, the number of adjacent blocks and the number of prediction sub-blocks comprises:

determining a frame type weight corresponding to the current prediction block according to a correspondence between a frame type of the current prediction block and a preset frame type weight;

generating an added threshold according to the frame type weight;

summing the number of adjacent blocks and the number of prediction sub-blocks to obtain a sum result; and taking at least one preset reference frame type as an added mask corresponding to the current prediction block when the sum result is less than or equal to the added threshold.

13. An inter prediction apparatus, comprising:

a memory, configured to store executable instructions; and a processor, when executing the executable instructions stored in the memory, configured to perform:

determining, when a current prediction mode of a current prediction block is a preset prediction mode, a historical prediction mode corresponding to the current prediction block, the historical prediction mode being a prediction mode in which prediction is completed before the preset prediction mode;

acquiring adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type;

generating a reference frame mask based on the historical optimal reference frame type, the adjacent block information, the prediction sub-block information, and a frame type corresponding to the current prediction block; and determining a reference frame of the preset prediction mode using the reference frame mask, and performing inter prediction on the current prediction block using the reference frame to obtain a prediction value corresponding to the current prediction block.

14. The apparatus according to claim 13, wherein the adjacent block information comprises: a motion vector of the adjacent block, a reference frame type of the adjacent block, and a number of adjacent blocks; the prediction sub-block information comprises: a reference frame type of the prediction sub-block and the number of prediction sub-blocks;

the generating a reference frame mask based on the historical optimal reference frame type, the adjacent block information, the prediction sub-block information, and a frame type corresponding to the current prediction block comprises:
  determining an initial mask corresponding to the current prediction block based on the historical optimal reference frame type, the reference frame type of the prediction sub-block and the reference frame type of the adjacent block;
  generating a main mask corresponding to the current prediction block according to the motion vector of the adjacent block;
  determining an added mask corresponding to the current prediction block using the frame type of the current prediction block, the number of adjacent blocks and the number of prediction sub-blocks; and
  generating the reference frame mask corresponding to the current prediction block using the initial mask, the main mask and the added mask.

15. The apparatus according to claim 14, wherein the determining an initial mask corresponding to the current prediction block based on the historical optimal reference frame type, the reference frame type of the prediction sub-block and the reference frame type of the adjacent block comprises:
  determining a first initial mask according to the reference frame type of the prediction sub-block and the reference frame type of the adjacent block;
  taking the historical optimal reference frame type as a second initial mask; and
  determining the initial mask corresponding to the current prediction block using the first initial mask and the second initial mask.

16. The apparatus according to claim 15, wherein the determining a first initial mask according to the reference frame type of the prediction sub-block and the reference frame type of the adjacent block comprises:
  determining at least one historical selected reference frame type using the reference frame type of the adjacent block and the reference frame type of the prediction sub-block;
  calculating a selection count of each historical selected reference frame type in the at least one historical selected reference frame type; and
  selecting a first initial mask from the at least one historical selected reference frame type based on the selection count.

17. The apparatus according to claim 16, wherein the screening out a first initial mask from the at least one historical selected reference frame types based on the selection count comprises:
  determining a maximum selection count from the selection counts of the respective historical selected reference frame types;
  amplifying the selection count of each historical selected reference frame type to obtain an amplified selection count;
  comparing the amplified selection count with the maximum selection count to obtain a comparison result corresponding to each historical selected reference frame type, the comparison result characterizing whether the amplified selection count is greater than or equal to the maximum selection count; and
  determining a historical selected reference frame type corresponding to the comparison result characterizing that the amplified selection count is greater than or equal to the maximum selection count as the first initial mask.

18. The apparatus according to claim 15, wherein the initial mask is null; the processor is further configured to perform:
  adding at least one preset reference frame type to the initial mask to obtain a corrected initial mask; and
  the generating the reference frame mask corresponding to the current prediction block using the initial mask, the main mask and the added mask comprises:
    generating the reference frame mask corresponding to the current prediction block using the corrected initial mask, the main mask and the added mask.

19. The apparatus according to claim 13, wherein the adjacent block information comprises: a reference frame type of the adjacent block; the prediction sub-block information comprises: a reference frame type of the prediction sub-block; the acquiring adjacent block information about an adjacent block of the current prediction block and prediction sub-block information about a prediction sub-block comprises:
  judging an optimal prediction mode of the adjacent block to obtain a first judgment result, and judging an optimal prediction mode of the prediction sub-block to obtain a second judgment result, the first judgment result characterizing whether the optimal prediction mode of the adjacent block is a first preset mode, and the second judgment result characterizing whether the optimal prediction mode of the prediction sub-block is a second preset mode;
  acquiring the reference frame type of the adjacent block when the first judgment result characterizes that the optimal prediction mode of the adjacent block is the first preset mode; and
  acquiring the reference frame type of the prediction sub-block when the second judgment result characterizes that the optimal prediction mode of the prediction sub-block is the second preset mode.

20. A non-transitory computer-readable storage medium, storing executable instructions, the executable instructions, when executed by a processor, implementing:
  determining, when a current prediction mode of a current prediction block is a preset prediction mode, a historical prediction mode corresponding to the current prediction block, the historical prediction mode being a prediction mode in which prediction is completed before the preset prediction mode;
  acquiring adjacent block information about an adjacent block of the current prediction block, prediction sub-block information about a prediction sub-block, and a historical optimal reference frame type of the current prediction block in the historical prediction mode, the prediction sub-block being obtained by partitioning the current prediction block using a sub-block division type preceding a current sub-block division type;
  generating a reference frame mask based on the historical optimal reference frame type, the adjacent block information, the prediction sub-block information, and a frame type corresponding to the current prediction block; and
  determining a reference frame of the preset prediction mode using the reference frame mask, and performing inter prediction on the current prediction block using the reference frame to obtain a prediction value corresponding to the current prediction block.

* * * * *